US012722556B2

(12) United States Patent
El-Wakeel et al.

(10) Patent No.: US 12,722,556 B2
(45) Date of Patent: Sep. 1, 2026

(54) EXPANDABLE FOOD CART

(71) Applicant: Imam Abdulrahman Bin Faisal University, Dammam (SA)

(72) Inventors: Hala El-Wakeel, Dammam (SA); Asma Yousuf Aloraifi, Dammam (SA); Haifa Alarifi, Dammam (SA); Njood Khaled Almarshd, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 273 days.

(21) Appl. No.: 18/654,396

(22) Filed: May 3, 2024

(65) Prior Publication Data

US 2025/0340162 A1 Nov. 6, 2025

(51) Int. Cl.
*B60P 3/025* (2006.01)
*A47F 9/00* (2006.01)

(52) U.S. Cl.
CPC ............ *B60P 3/0257* (2013.01); *A47F 9/005* (2013.01)

(58) Field of Classification Search
CPC ........ B60P 3/025; B60P 3/0257; A47F 9/005; B60R 9/06
USPC ........................................................... 296/22
See application file for complete search history.

(56) References Cited

U.S. PATENT DOCUMENTS 2,982,578 A 5/1961 Lowe
4,770,458 A * 9/1988 Burke ...................... B60R 9/00 296/3
4,936,624 A * 6/1990 West ...................... B60R 11/06 224/544
5,037,152 A * 8/1991 Hendricks ................ B60R 9/00 296/26.06
5,383,703 A * 1/1995 Irvine, III ............ B62D 63/061 296/24.45
(Continued)

FOREIGN PATENT DOCUMENTS

EP 1 000 572 A2 5/2000
JP 2017035988 A * 2/2017
(Continued)

OTHER PUBLICATIONS

"Boscarrelli 400 Fly Pizza", Boscarrelli, Sep. 24, 2021.
(Continued)

*Primary Examiner* — Laura Freedman
(74) *Attorney, Agent, or Firm* — Oblon, McClelland, Maier & Neustadt, L.L.P.

(57) ABSTRACT

An expandable food cart for use in a vehicle trailer or a pick-up truck bed and a method for assembling the expandable food cart in the vehicle trailer or pick-up truck bed are described. The expandable food cart comprises a collapsible frame configured to conform with a front end cross section and a back end cross section of the vehicle trailer or pick-up truck bed. The expandable food cart further comprises an expandable shading unit having a side expanding portion and a top expanding portion. The expandable food cart further comprises a utility box located in the front end cross section between a first side of the collapsible frame and a second side of the collapsible frame. The expandable food cart further comprises collapsible shelves configured to attach to a sidewall of the vehicle trailer or pick-up truck bed. The expandable food cart further comprises an expandable work surface.

20 Claims, 25 Drawing Sheets

(56) References Cited

U.S. PATENT DOCUMENTS

| | | | | | |
|---|---|---|---|---|---|
| 5,476,301 | A * | 12/1995 | Berkich | B60R 9/00 | 224/403 |
| 5,570,988 | A * | 11/1996 | Gallaway | B60P 1/003 | 414/498 |
| 6,431,628 | B1 * | 8/2002 | Bell, Jr. | B60P 3/0257 | 296/22 |
| 6,712,422 | B1 * | 3/2004 | Vaillancourt | B60P 3/341 | 296/170 |
| 7,461,884 | B2 * | 12/2008 | Clare | B60J 10/60 | 296/37.6 |
| 7,641,251 | B1 * | 1/2010 | Stepanians | B60P 3/40 | 296/3 |
| 9,403,424 | B2 * | 8/2016 | Cortez | B60J 7/141 | |
| 10,005,382 | B1 * | 6/2018 | Rossi | B60P 3/0255 | |
| 10,557,276 | B1 * | 2/2020 | Uhl | B60P 3/0252 | |
| 12,311,991 | B2 * | 5/2025 | Lukito | B62B 5/0086 | |
| 2009/0127306 | A1 * | 5/2009 | Mims | B60R 9/00 | 224/404 |
| 2017/0158108 | A1 * | 6/2017 | Elbaz | B60P 3/0255 | |
| 2020/0397194 | A1 * | 12/2020 | Goldberg | G06T 19/006 | |

FOREIGN PATENT DOCUMENTS

| | | | | | |
|---|---|---|---|---|---|
| KR | 101323961 | B1 * | 10/2013 | B60P 3/36 |
| KR | 10-2055993 | B1 | 12/2019 | |

OTHER PUBLICATIONS

Hugo Mccafferty,"Chef's Table to hit Street Food in New Spin-Off", Finediningloversﾠ, Mar. 20, 2019.

"Villertech Folding Shelf 4 Tier, Folding Bookshelf Foldable Shelf, Metal Folding Storage Shelves with Wheels, Folding Shelf Unit for Kitchen, Living Room, Study, Greenhouse(White)", Amazon, Nov. 6, 2023.

* cited by examiner

EXPANDABLE FOOD CART

BACKGROUND

Technical Field

The present disclosure is directed to mobile vending units, and specifically to an expandable food cart designed for installation within a pick-up truck bed of a pick-up truck and a method of assembling such expandable food cart in the pick-up truck bed.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In mobile vending, particularly within food and beverage services, the utilization of vehicles such as pick-up trucks has become increasingly prevalent. The state of the art provides a variety of configurations where a bed of the pick-up truck is adapted to serve as a mobile platform for vending operations. These adaptations often include the installation of fixed structures designed to support the vending activities, including storage, food preparation, and service areas. The primary appeal of such setups lies in their mobility, faciliating vendors to transport their operations to various locations, including street corners, festivals, and events, thereby reaching a wider customer base.

However, these conventional set-ups have certain limitations. One significant issue is the lack of flexibility and adaptability in the design of these mobile vending units. Fixed structures, once installed, offer limited scope for reconfiguration or expansion, thereby constraining ability of the vendor to customize their setup based on the specific requirements of different vending locations or events. Additionally, these fixed installations often fail to make efficient use of the limited space available within the bed of a pick-up truck, leading to suboptimal operational efficiency and reduced vendor effectiveness.

Some solutions have attempted to introduce elements of modularity and collapsibility into the design of mobile vending units. These solutions typically involve the use of foldable or detachable components, such as shelves and counters, which can be reconfigured or removed as needed to suit different vending scenarios. However, such modular and collapsible designs still fall short in terms of providing an efficient vending setup. For instance, the mechanisms for expanding or collapsing these components are often cumbersome or time-consuming to operate, detracting from the overall efficiency of the vending operation. Furthermore, such designs frequently compromise on aesthetic appeal and structural integrity in favor of modularity, resulting in vending setups that may be perceived as less professional or inviting by potential customers.

KR 2055993B1 describes a food truck with a flat bed truck. A front and rear support are installed on the truck with a center bar therebetween. A door is installed in the rear support, which opens to a cooking unit. A wing body having an angled structure pivots on one side on the center bar so that the wing body covers the roof and one side of the food truck when closed and can be pivoted to open and form a shading unit when deployed. A frame can be pulled out from the side of the truck. An outer space appears to have a canopy which can be raised over a shelf. However, this reference does not provide a food cart with a collapsible frame supporting an expandable shading unit, and comprising collapsible shelves and an expandable work surface.

EP1000572A2 describes a booth for the display and sale of goods. The roof can hold at least one sun shade. However, this reference does not provide a food cart with a collapsible frame supporting an expandable shading unit, and comprising collapsible shelves and an expandable work surface.

U.S. Pat. No. 2,982,578A describes a food truck having a sliding table with front legs which can slide on a track through the rear door. A serving table structure is provided on the underside with longitudinal roller channels to each of which are secured a set of rollers. The rollers rest on the upper sides of the channel runners, thereby slidably supporting the table structure within the truck. When the truck doors are open, the table structure may be rolled out by a means comprising a pneumatic or hydraulic cylinder. As the table structure extends, a pair of wheeled support legs are preferably adapted to be lowered and locked into position for supporting the outer end of the table structure on the ground. However, this reference does not provide a food cart with a collapsible frame supporting an expandable shading unit, and comprising collapsible shelves and an expandable work surface.

Non-patent reference titled "BOSCARRELLI 400 FLY PIZZA," describes a pizza trailer having a cooking unit. The pizza trailer is adapted to be hitched to a three wheeled truck. The sides of the truck open to form shading units on either side of the truck. The shading units are on pivots running the length of the food truck bed and are held in position by struts. The truck has pull out drawers and the back of the truck can pull down to make a service area. The shading units of this reference are similar in construction to the side panels of the shading units of the present disclosure. This pizza trailer is a complete unit which is pulled by a truck. However, this reference does not provide a food cart with a collapsible frame supporting an expandable shading unit, and comprising collapsible shelves and an expandable work surface.

Each of the aforementioned references suffers from one or more drawbacks hindering their adoption, as noted above. Therefore, there is a requirement for a mobile vending unit which can provide modularity and flexibility, while also addressing the operational, aesthetic, and structural shortcomings of existing solutions. Accordingly, it is one object of the present disclosure to provide an expandable food cart for use in a pick-up truck bed and a method of assembling such food cart in the pick-up truck bed, providing an adaptable and aesthetic platform for mobile vending operations.

SUMMARY

In an embodiment, an expandable food cart for use in a pick-up truck bed is described. The expandable food cart comprises a collapsible frame configured to conform with a front end cross section and a back end cross section of the pick-up truck bed. The expandable food cart further comprises an expandable shading unit having a side expanding portion and a top expanding portion. The expandable food cart further comprises a utility box located in the front end cross section between a first side of the collapsible frame and a second side of the collapsible frame. The expandable food cart further comprises collapsible shelves configured to attach to a sidewall of the pick-up truck bed. The expandable food cart further comprises an expandable work surface.

In another embodiment, a method for assembling an expandable food cart in a pick-up truck bed is described. The method comprises assembling a collapsible frame between a front end cross section and a back end cross section of the pick-up truck bed. The method further comprises connecting an expandable shading unit having a side expanding portion and a top expanding portion to the collapsible frame. The method further comprises installing a utility box in the front end cross section between a first side of the collapsible frame and a second side of the collapsible frame. The method further comprises attaching, by hooks, a set of collapsible shelves to a sidewall of the pick-up truck bed. The method further comprises installing an expandable work surface between the front end cross section and the back end cross section of the pick-up truck bed.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
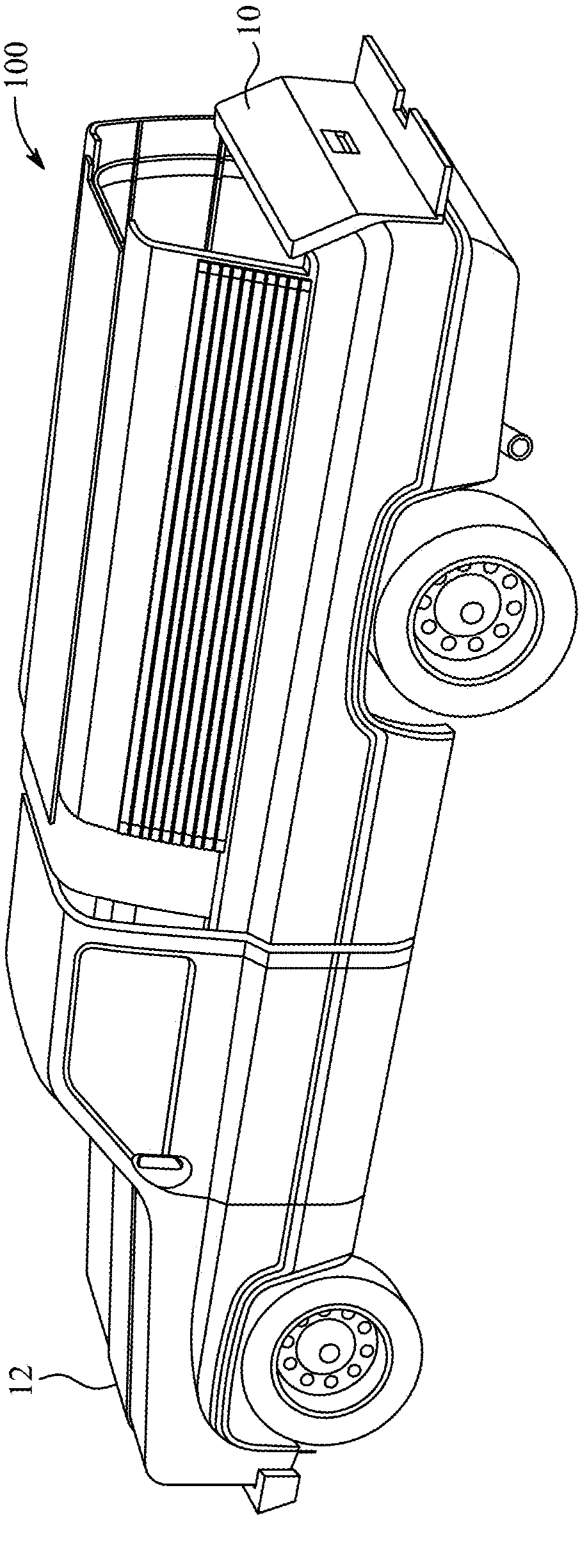
FIG. 1A is an exemplary diagram of an non-deployed expandable food cart installed in a pick-up truck bed, according to certain embodiments.

In the drawings, like reference numerals designate identical or corresponding parts throughout the several views. Further, as used herein, the words “a”, “an” and the like generally carry a meaning of “one or more”, unless stated otherwise.

Furthermore, the terms “approximately,” “approximate”, “about” and similar terms generally refer to ranges that include the identified value within a margin of 20%, 10%, or preferably 5%, and any values therebetween.

Aspects of the present disclosure describe an expandable food cart which is portable and which can be transported by a vehicle drawing a vehicle trailer, assembled within and around the vehicle trailer using the vehicle trailer as a support surface. The expandable food cart provides a food storage area, an expandable work surface, a display area and expandable shading units to protect a user and customers from sunlight, rain or other environmental conditions. The vehicle trailer may be a separate unit which can be attached to a vehicle or may be part of a vehicle, such as a pick-up truck bed of a pick-up truck. The vehicle trailer may be drawn by any of a bicycle, a motorcycle, a horse, oxen, buffalo, a human, an automobile, a truck cab, a van, a sport utility vehicle (SUV) and the like. Aspects presented below describe the vehicle trailer as conveyed, stored and assembled within a pick-up truck bed, however, the vehicle trailer may be adapted for use with any of the aforementioned types of conveyance.

Aspects of this disclosure are directed to an expandable food cart designed for use in a pick-up truck bed and a method of assembling such expandable food cart in the pick-up truck bed. The expandable food cart is designed for integration and use within the pick-up truck bed.

The expandable food cart is configured to transform from a non-deployed configuration, occupying minimal space within the pick-up truck bed, to a deployed configuration, maximizing utility and operational space available for vending activities. The expandable food cart is designed to be easily assembled and transform in the pick-up truck bed, so that users (vendors) can quickly transition from transportation to operation modes. The expandable food cart of the present disclosure provides a practical approach to mobile vending, addressing key operational challenges through a simple yet effective design.

Referring to FIG. 1A, illustrated is a diagrammatic view of an expandable food cart 100 installed in a pick-up truck bed 10, as per embodiments of the present disclosure. As seen, the pick-up truck bed 10 is part of a vehicle 12, where the expandable food cart 100 is positioned to maximize utility of space provided by the pick-up truck bed 10. It may be appreciated that although the accompanying drawings depict the vehicle 12 as a pick-up truck (with the two terms being interchangeably used hereinafter), in other examples, the vehicle 12 may be any of other suitable form, such as a trailer, a van, a sport utility vehicle (SUV) and the like, without any limitations. The design of the expandable food cart 100 is such that it complements the dimensions and structure of the pick-up truck bed 10 for a secure fit and optimal use of the available area. The installation of the expandable food cart 100 within the pick-up truck bed 10 faciliates an efficient transition between a non-deployed configuration (for transportation) and a deployed configuration (for vending operations), providing a solution for mobile vending requirements.

The dimensions and relative proportions of the various components of the expandable food cart 100, in relation to the pick-up truck bed 10, are depicted in the accompanying drawings provided herein. These illustrations are intended to convey a general understanding of the spatial relationships and scale of the components within the context of a typical pick-up truck bed. It should be noted that while these dimensions are representative, they are not intended to be limiting, as variations in the sizes of both components of the expandable food cart 100 and the pick-up truck bed 10 may occur. The depictions are therefore to be considered illustrative rather than definitive, for explanation of aspects of the present disclosure of the expandable food cart 100 without any limitations.

Figure 1B:
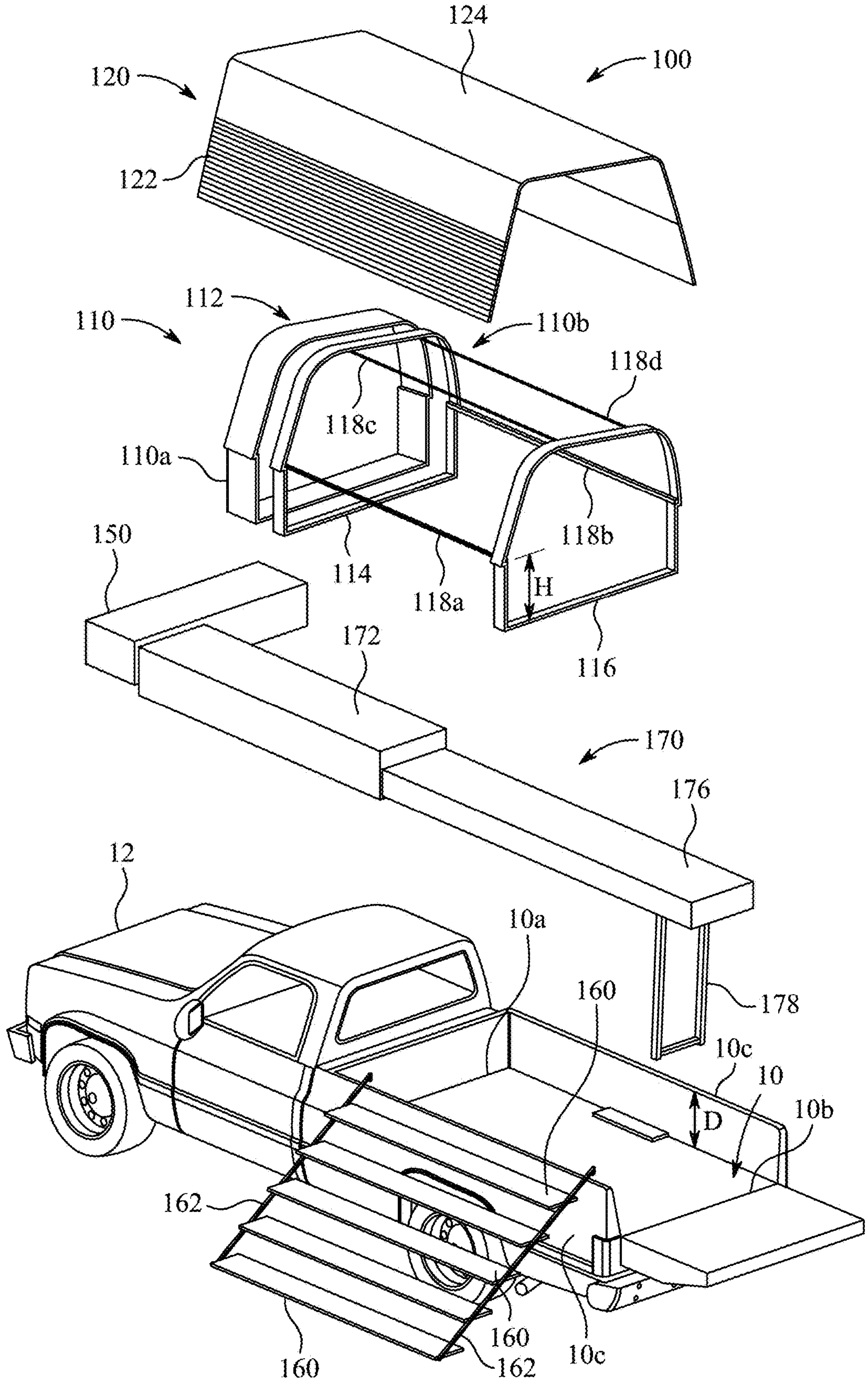
FIG. 1B is an exemplary exploded view of the expandable food cart of FIG. 1A, according to certain embodiments.

Referring to FIG. 1B, illustrated is an exemplary exploded view of the expandable food cart 100, showing its various components. As illustrated, the expandable food cart 100 includes a collapsible frame 110, an expandable shading unit 120, a utility box 150, collapsible shelves 160, and an expandable work surface 170. Each of these components contribute to functionality of the expandable food cart 100. In the expandable food cart 100, the collapsible frame 110 serves as the structural backbone of the expandable food cart 100, providing stability and support for the other components. The expandable shading unit 120 is designed to provide protection and comfort from environmental elements while vending. The utility box 150 provides a dedicated space for storing essential items such as water tanks, gas tanks, and other utilities required for performing the vending operations using the expandable food cart 100. The collapsible shelves 160 provide flexible display and storage options that can be adjusted according to the vending operations requirements. The expandable work surface 170 provides a spacious and adaptable area for food preparation and service. The integration of these components provides the expandable food cart 100 with adaptability and efficiency required for mobile vending operations.

Figure 1C:
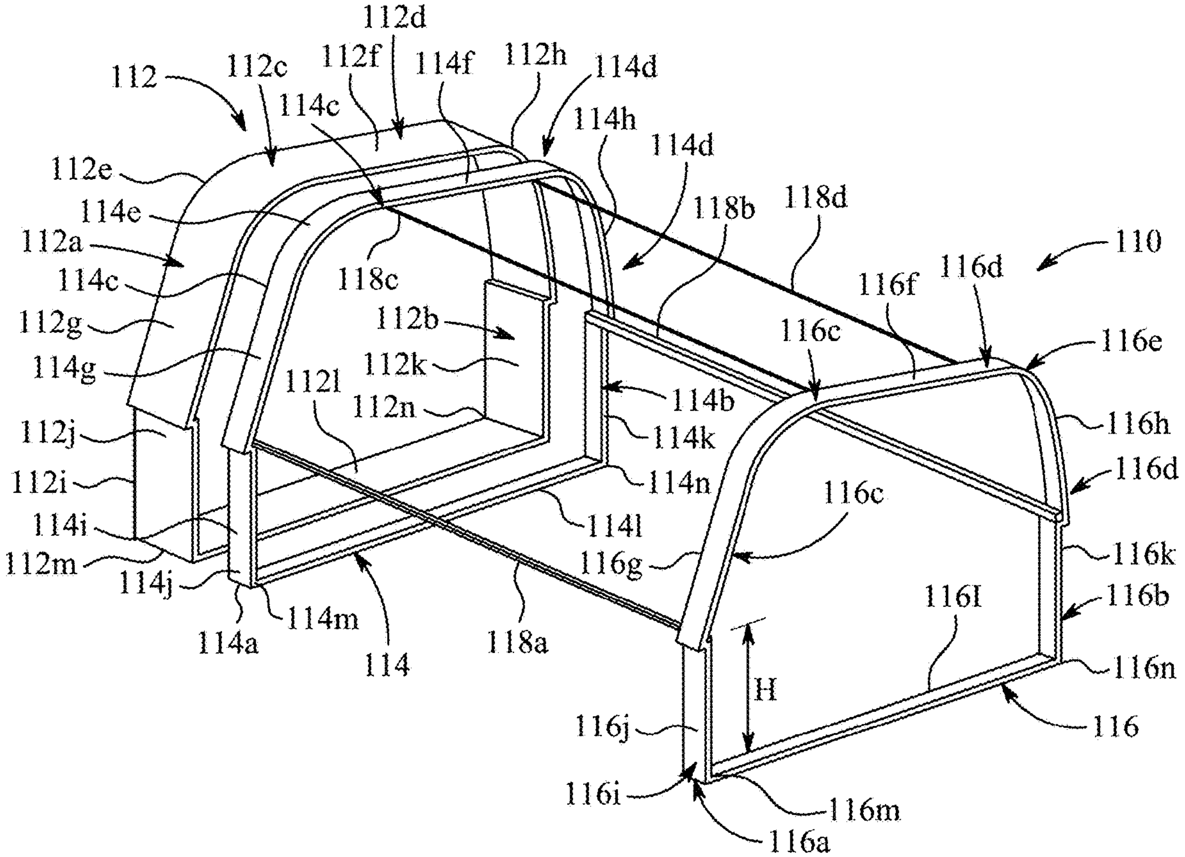
FIG. 1C is an exemplary diagram of a collapsible frame of the expandable food cart, according to certain embodiments.

Referring now to FIGS. 1B and 1C in combination, as illustrated, the collapsible frame 110 is configured to conform with a front end cross section 10*a* and a back end cross section 10*b* of the pick-up truck bed 10. The collapsible frame 110 has a first side 110*a* and a second side 110*b*, which conform with sidewalls 10*c* of the pick-up truck bed 10. In particular, the collapsible frame 110 comprises at least three frame structures, including a first frame structure 112, a second frame structure 114, and a third frame structure 116. In the collapsible frame 110, the first frame structure 112 is configured to attach to the front end cross section 10*a* of the pick-up truck bed 10. The second frame structure 114 is located between the first frame structure 112 and the third frame structure 116. The second frame structure 114 is configured to attach to the first frame structure 112. The third frame structure 116 is configured to attach to the back end cross section 10*b* of the pick-up truck bed 10.

Here, the first frame structure 112 has a first side 112*a* (corresponding to the first side 110*a* of the collapsible frame 110) and a second side 112*b* (corresponding to the second side 110*b* of the collapsible frame 110). Similarly, the second frame structure 114 has a first side 114*a* and a second side 114*b*; and the third frame structure 116 has a first side 116*a* and a second side 116*b*. Further, the first frame structure 112 has a first top portion 112*c* and a second top portion 112*d*; the second frame structure 114 has a first top portion 114*c* and a second top portion 114*d*; and the third frame structure 116 has a first top portion 116*c* and a second top portion 116*d*. More specifically, each frame structure 112, 114, 116 has an upper section 112*e*, 114*e*, 116*e* having an isosceles trapezoidal shape with curved corners, which includes a straight top portion 112*f*, 114*f*, 116*f*, an angled first side portion 112*g*, 114*g*, 116*g* and an angled second side portion 112*h*, 114*h*, 116*h*. It may be noted that the first top portion 112*c* and the second top portion 112*d* of the first frame structure 112 form the straight top portion 112*f* therein. Similarly, the first top portion 114*c* and the second top portion 114*d* of the second frame structure 114 form the straight top portion 114*f* therein; and the first top portion 116*c* and the second top portion 116*d* of the third frame structure 116 form the straight top portion 116*f* therein. Further, each frame structure 112, 114, 116 has a lower section 112*i*, 114*i*, 116*i* including a vertical first side portion 112*j*, 114*j*, 116*j*, a vertical second side portion 112*k*, 114*k*, 116*k*, and a straight bottom rail 112*l*, 114*l*, 116*l* connected between a bottom end 112*m*, 114*m*, 116*m* of the vertical first side portion 112*j*, 114*j*, 116*j* and a bottom end 112*n*, 114*n*, 116*n* of the vertical second side portion 112*k*, 114*k*, 116*k*.

Further, the collapsible frame 110 includes a first side support rail 118*a*, a second side support rail 118*b*, a first top support rail 118*c* and a second top support rail 118*d*. The first side support rail 118*a* is configured to connect the first side 114*a* of the second frame structure 114 to the first side 116*a* of the third frame structure 116 at a height 'H' equal to about a depth 'D' of the pick-up truck bed 10. Similarly, the second side support rail 118*b* is configured to connect the second side 114*b* of the second frame structure 114 to the second side 116*b* of the third frame structure 116 at the height 'H' equal to about the depth 'D' of the pick-up truck bed 10. The first top support rail 118*c* is configured to connect the first top portion 114*c* of the second frame structure 114 to the corresponding first top portion 116*c* of the third frame structure 116. Here, the first top portion 114*c* and the corresponding first top portion 116*c* are located near the first sides 114*a*, 116*a*. Similarly, the second top support rail 118*d* is configured to connect the second top portion 114*d* of the second frame structure 114 to the corresponding second top portion 116*d* of the third frame structure 116. Here, the second top portion 114*d* and the corresponding second top portion 116*d* are located near the second sides 114*b*, 116*b*.

In the collapsible frame 110, the straight top portion 112*f*, 114*f*, 116*f* of the upper section 112*e*, 114*e*, 116*e* is configured to connect to and support the expandable shading unit 120 and the straight bottom rail 112*l*, 114*l*, 116*l* is configured to be mounted in the pick-up truck bed 10. That is, the straight top portion 112*f* of the upper section 112*e* of the first frame structure 112, the straight top portion 114*f* of the upper section 114*e* of the second frame structure 114, and the straight top portion 116*f* of the upper section 116*e* of the third frame structure 116 are each specifically designed to connect to and provide support for the expandable shading unit 120. This connection facilitates the secure attachment and stabilization of the expandable shading unit 120 to the collapsible frame 110, ensuring that the expandable shading unit 120 remains in place and functions as intended to provide shade and protection during vending operations. Furthermore, the straight bottom rail 112*l* of the first frame structure 112, the straight bottom rail 114*l* of the second frame structure 114, and the straight bottom rail 116*l* of the third frame structure 116 are each designed to be mounted within the pick-up truck bed 10. This mounting configuration ensures that the collapsible frame 110 is securely anchored to the pick-up truck bed 10, providing a stable foundation for the expandable food cart 100.

In an aspect of the present disclosure, the collapsible frame 110 has an adjusting feature to facilitate accommodation within various sizes of pick-up truck beds 10, enhancing the versatility and applicability of the food cart across different vehicle models. For this purpose, the support rails 118*a*-118*d* may be configured as telescopic members. In an example, each of the support rails 118*a*-118*d* may include an outer tube connected with one of the frame structures 114, 116 and a corresponding inner tube, dimensioned smaller than the outer tube, and connected to other one of the frame structures 114, 116, to faciliate telescopic adjustment between the two. In a non-limiting example, the outer tube and the inner tube may be square-shaped. Such adjustable mechanism provides that a width of the collapsible frame 110 to be varied to conform to the front end cross section 10*a* and the back end cross section 10*b* of the pick-up truck bed 10, by sliding the inner tubes relative to the outer tubes to either expand or contract the overall width of the collapsible frame 110. The adjusting feature may also implement a catch-latch mechanism through the use of hook that is affixed, possibly through riveting, to the outer tube. This hook may engage with a button-type bolt head that protrudes from the inner tube. When the outer tube is adjusted to the desired width and aligned with the bolt head, the hook can latch onto the bolt head, effectively locking the two components in place and preventing any unintended sliding movement. This secure locking mechanism ensures that the collapsible frame 110 maintains its adjusted width during transport and operation, providing a stable structure for the various components of the expandable food cart 100.

Figure 1D:
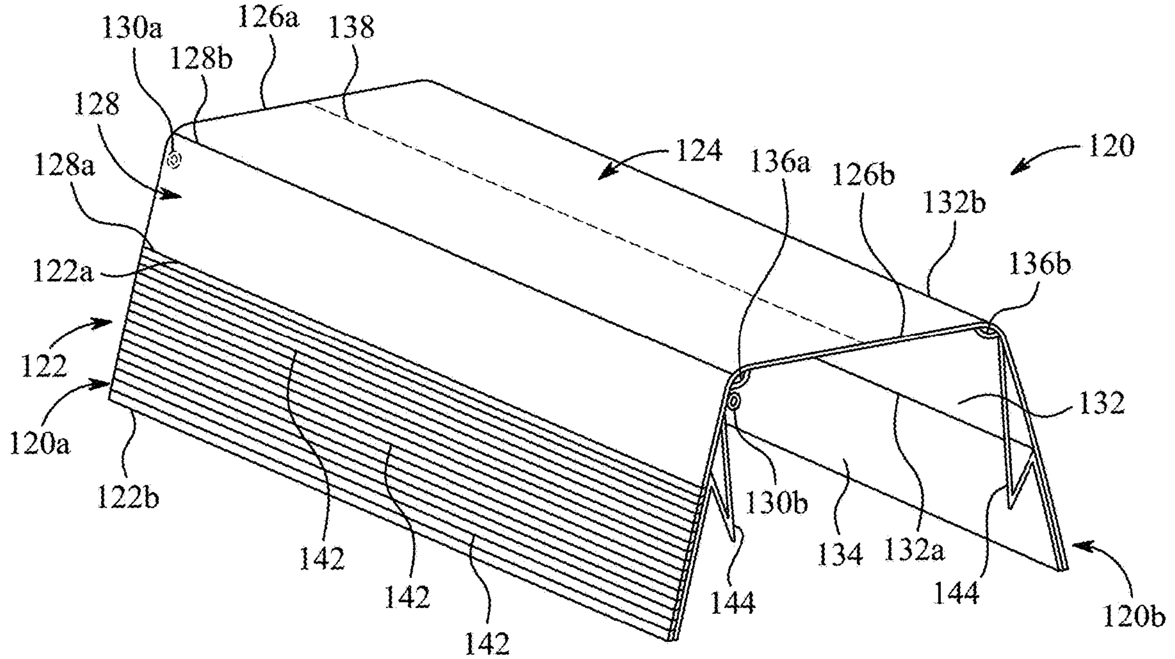
FIG. 1D is an exemplary diagram of an expandable shading unit of the expandable food cart, according to certain embodiments.

Referring now to FIGS. 1B and 1D in combination, as illustrated, the expandable shading unit 120 is configured to be supported on the collapsible frame 110. The expandable shading unit 120 has a first side 120*a* and a second side 120*b*, complementary to the first side 110*a* and the second side 110*b*, respectively, of the collapsible frame 110. The expandable shading unit 120 has a side expanding portion 122 and a top expanding portion 124. The side expanding portion 122 has a first edge 122*a* and a second edge 122*b*. As may be seen, the top expanding portion 124 forms a major portion of the expandable shading unit 120 and supports the expandable shading unit 120 on the collapsible frame 110. In particular, the expandable shading unit 120 includes a first top rail 126*a* configured to connect to the second frame structure 114, and a second top rail 126*b* configured to connect to the third frame structure 116. Such connections ensures that the expandable shading unit 120 is securely anchored across its length to the collapsible frame 110, spanning from the second frame structure 114 to the third frame structure 116.

The expandable shading unit 120 also includes a first curved section 128 located on the first side 120*a* of the expandable shading unit 120 between the first top rail 126*a* and the second top rail 126*b*. The first curved section 128 has a first edge 128*a* and a second edge 128*b*. The first edge 122*a* of the side expanding portion 122 is connected to the first edge 128*a* of the first curved section 128. Further, the first curved section 128 is connected to the first top rail 126*a* by a first bar hinge 130*a* and to the second top rail 126*b* by a second bar hinge 130*b*. The bar hinges 130*a*, 130*b* facilitate the movement and adjustment of the first curved section 128, aiding with the expansion and retraction of the side expanding portion 122. The fixed connection between the first edge 122*a* of the side expanding portion 122 and the first edge 128*a* of the first curved section 128 faciliates such expansion in the expandable shading unit 120.

The expandable shading unit 120 further includes a second curved section 132 located on the second side 120*b* of the expandable shading unit 120 between the first top rail 126*a* and the second top rail 126*b*. The second curved section 132 has a first edge 132*a* and a second edge 132*b*. The second curved section 132, generally, mirrors the functionality and positioning of the first curved section 128 but on the opposite side (i.e., the second side 120*b*) of the expandable shading unit 120. The expandable shading unit 120 includes a solid panel 134 connected to the first edge 132*a* of the second curved section 132. The solid panel 134 is connected to the second side support rail 118*b*. With such configuration, the second curved section 132 and the solid panel 134 connected thereto enhances the structural integrity and functionality of the expandable shading unit 120.

In the expandable shading unit 120, a sliding mechanism is employed to facilitate the expansion and retraction of the top expanding portion 124. For this purpose, the expandable shading unit 120 includes a first D-shaped track 136*a* located within the second edge 128*b* of the first curved section 128, and a second D-shaped track **136*b* located within the second edge 132*b* of the second curved section 132. Herein, the second edge 128*b* of the first curved section 128 is located towards a center line 138 of the expandable shading unit 120 which extends from the first top rail 126*a* to the second top rail 126*b*. Similarly, the second edge 132*b* of the second curved section 132 is located towards the center line 138 of the expandable shading unit 120. The center line 138 serves as an axis extending from the first top rail 126*a* to the second top rail 126*b*, providing a reference for the alignment and movement of the top expanding portion 124. The positioning of the D-shaped tracks 136*a*, 136*b* relative to the center line 138 and the curved sections 128, 132 provides a balanced and smooth expansion (sliding) of the top expanding portion 124**.

This expansion faciliates the top expanding portion 124 to move from a non-deployed configuration (as shown in FIGS. 2A-2D), where it is abutting against the first top rail **126*a*; transitioning to a partially deployed configuration (as shown in FIGS. 3A-3D), and finally to a deployed configuration (as shown in FIGS. 4A-4G). In the deployed configuration, at least two-thirds of the top expanding portion 124 extend beyond the second top rail 126*b*, effectively increasing the shaded area provided by the expandable shading unit 120. This sliding mechanism, facilitated by the D-shaped tracks 136*a*, 136*b* provides a flexible and efficient means of adjusting the shading provided by the expandable food cart 100, catering to the varying requirements of the vending operations. In a non-limiting example, in FIGS. 2B-2D, 3B-3D and 4B-4**D, widths, lengths and heights of the components of the expandable food cart are shown in meters.

Figure 4A:
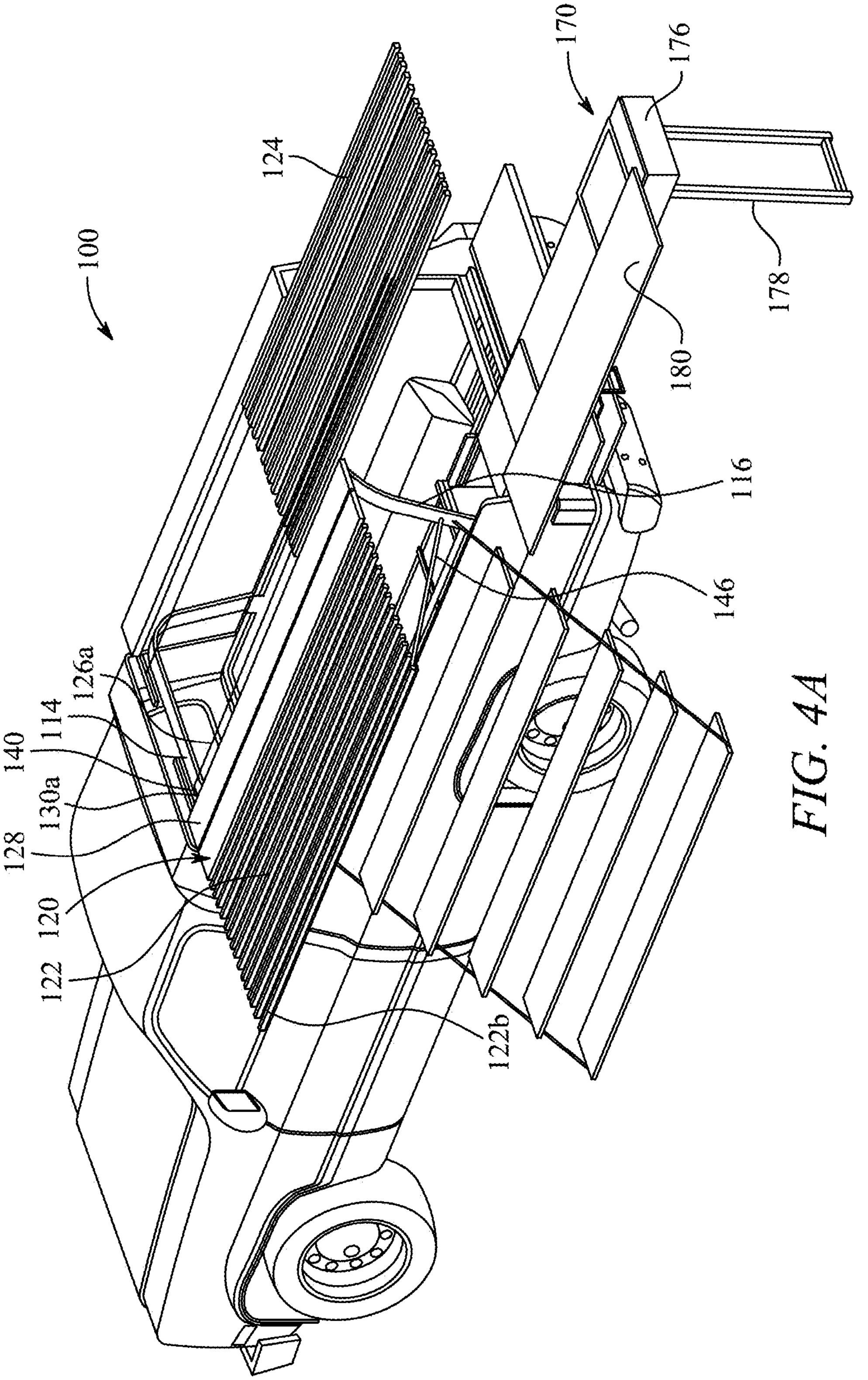
FIG. 4A is an exemplary perspective view diagram of the expandable food cart installed in the pick-up truck bed and disposed in a deployed configuration thereof, according to certain embodiments.
Figure 4B:
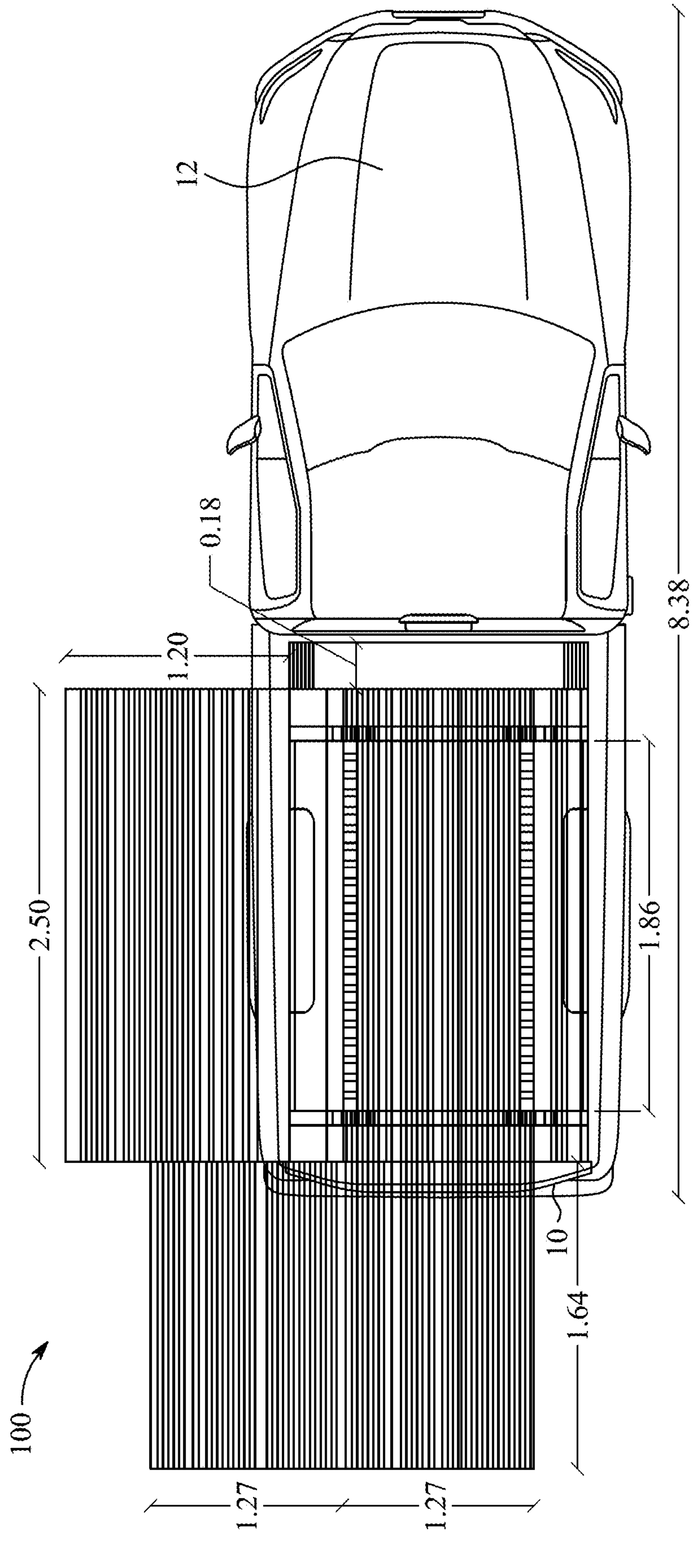
FIG. 4B is an exemplary top planar view diagram of the expandable food cart as shown in FIG. 4A, according to certain embodiments.
Figure 4C:
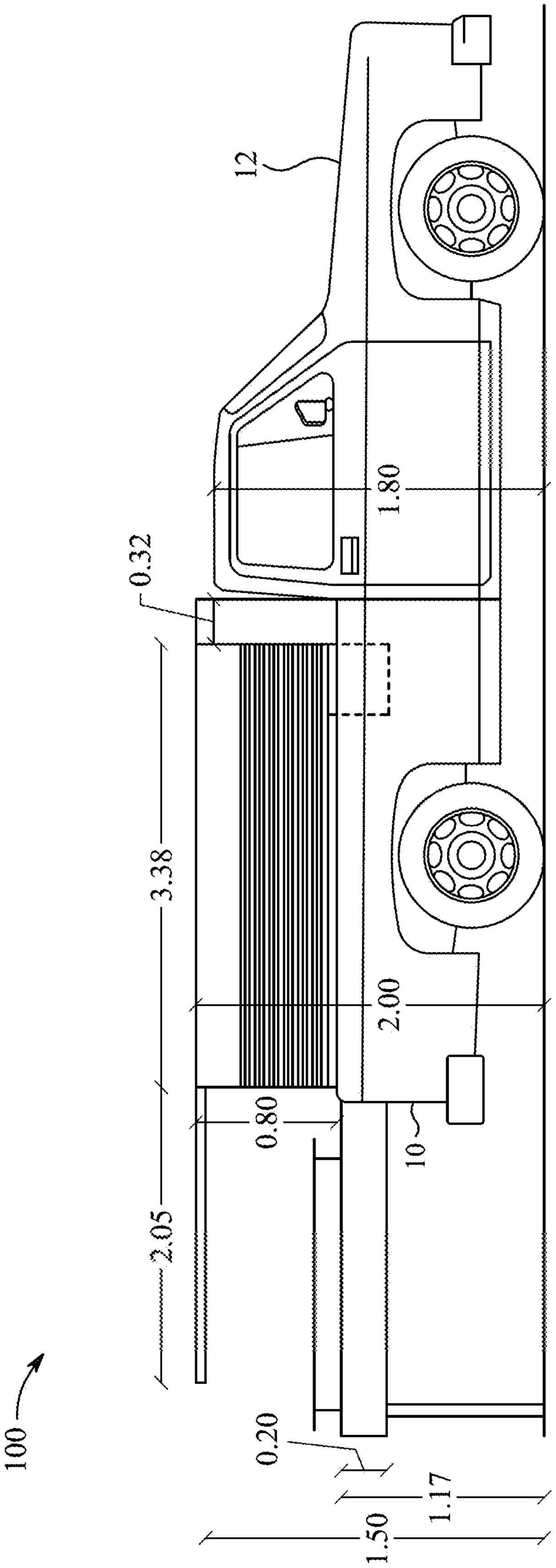
FIG. 4C is an exemplary side planar view diagram of the expandable food cart as shown in FIG. 4A, according to certain embodiments.
Figure 4D:
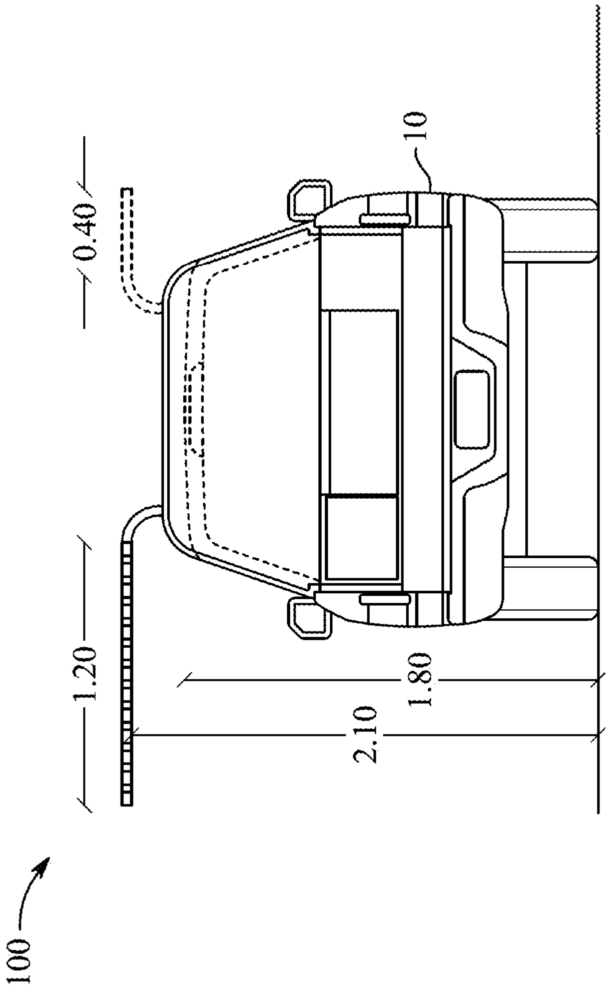
FIG. 4D is an exemplary back planar view diagram of the expandable food cart as shown in FIG. 4A, according to certain embodiments.
Figure 4E:
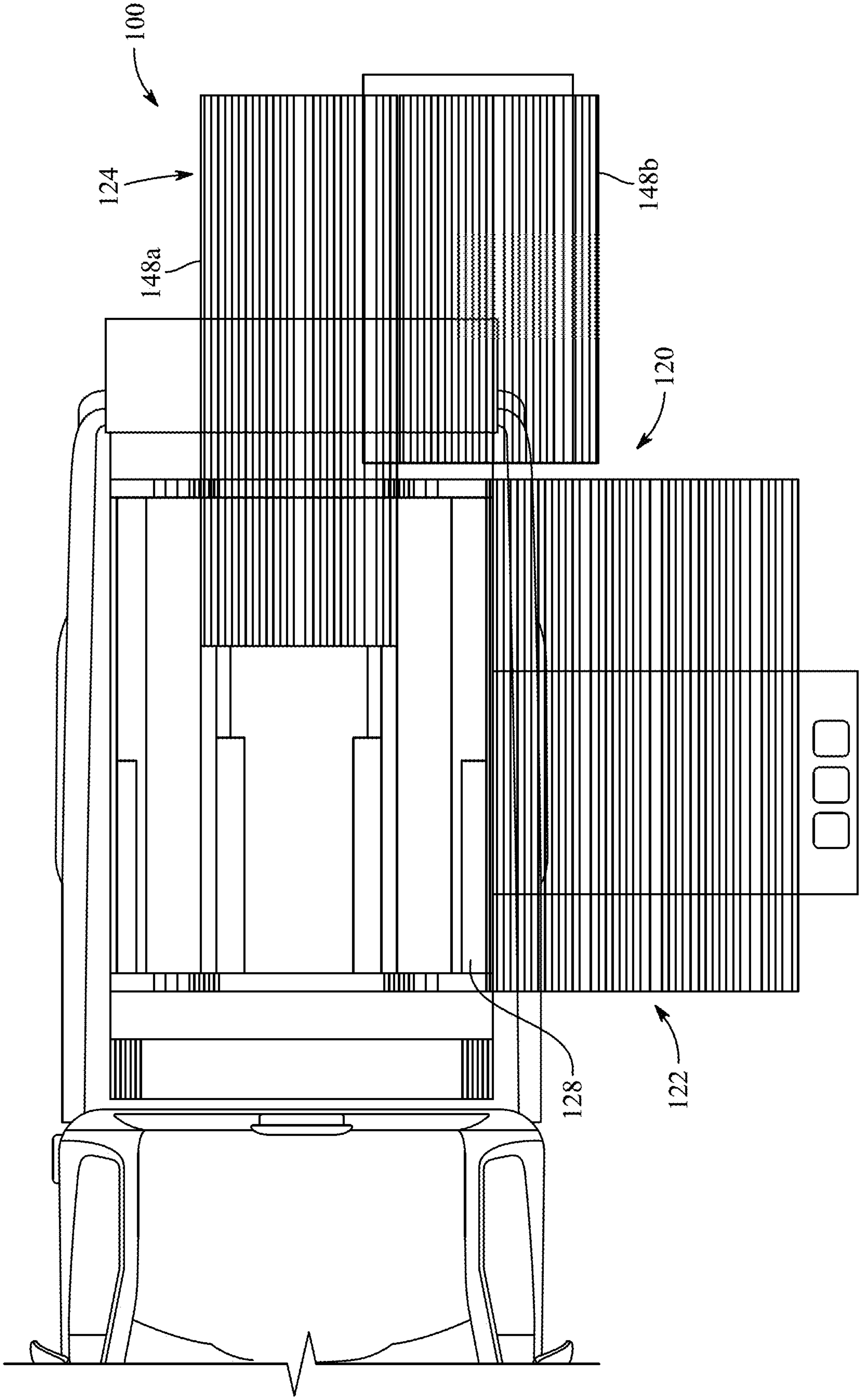
FIG. 4E is an exemplary partial top view diagram of the expandable food cart in the deployed configuration showing details of the expandable shading unit therein, according to certain embodiments.

In an aspect of the present disclosure, as illustrated in FIG. 4E, at least the said two-thirds extended portion of the top expanding portion 124 may be formed of two layers **148*a*, 148*b*. In an example, each of the two layers 148*a*, 148*b* may be formed of a plurality of slats, such that when arranged on top of each other, the top expanding portion 124 may appear to be of solid form (as depicted in FIGS. 3A-3D). These layers 148*a*, 148*b* are arranged in a manner that, when the said two-thirds extended portion of the top expanding portion 124 has been fully extended beyond the second top rail 126*b* (as discussed), the layer 148*b* may be actuated to unfold or flip over by rotating 180 degrees (for example, using a scissors mechanism, a powered hinge mechanism or the like). This unfolding action positions the two layers 148*a*, 148*b* side by side, effectively adjacent to one another, and thereby increasing surface area of the top expanding portion 124 in the deployed configuration of the expandable food cart 100**.

Figure 4F:
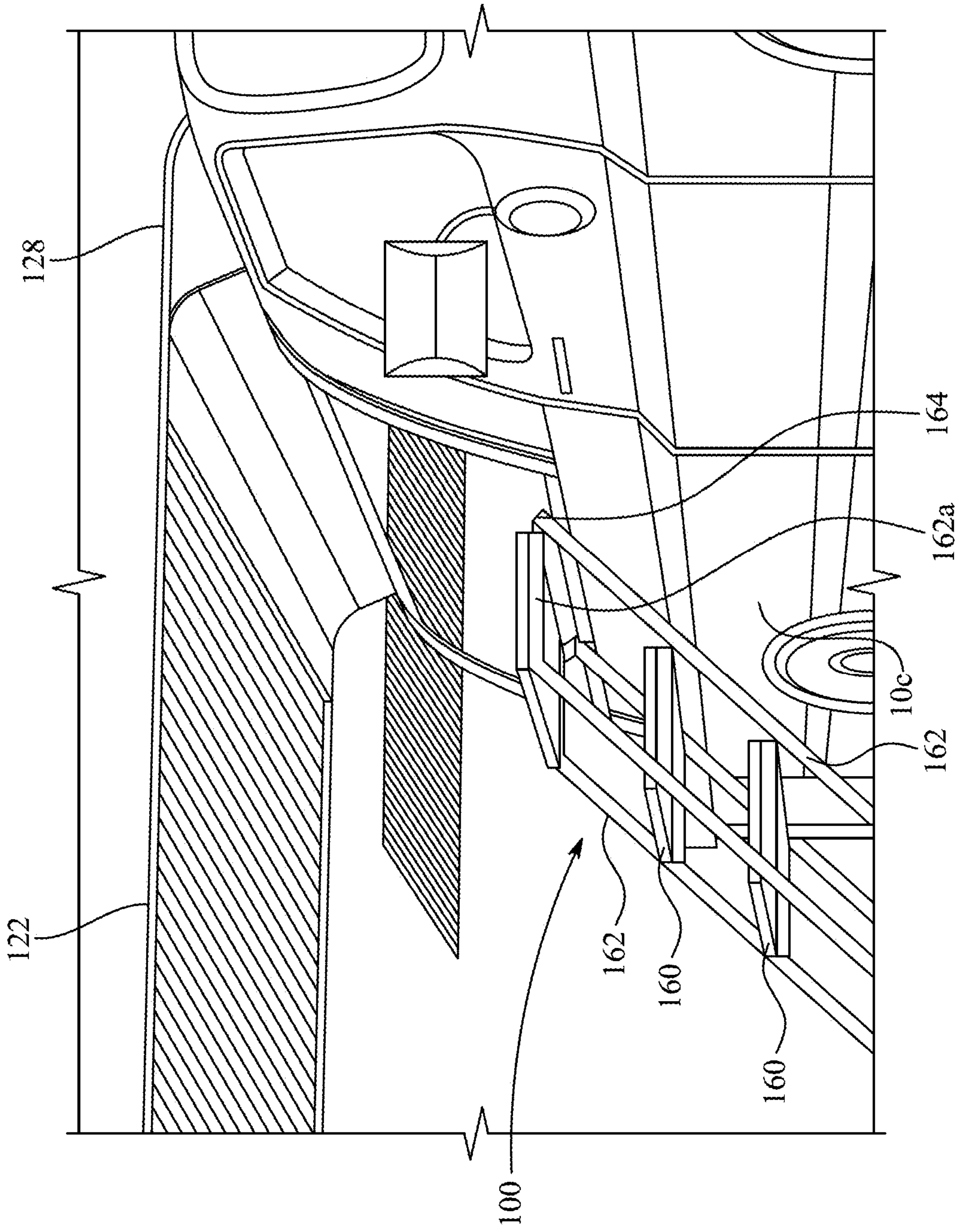
FIG. 4F is an exemplary partial side perspective view diagram of the expandable food cart in the deployed configuration showing details of the collapsible shelves therein, according to certain embodiments.

Further, in the expandable shading unit 120, the side expanding portion 122 is configured to expand to provide increased shading area for the expandable food cart 100. For this purpose, as illustrated in FIGS. 4A and 4F in combination, the side expanding portion 122 includes a hydraulic unit 140 connected to the second frame structure 114 and the first bar hinge **130*a*. The first bar hinge 130*a* serves as a junction point, facilitating pivotal movement of the first curved section 128 which is an integral part of the side expanding portion 122. The hydraulic unit 140 is configured to move the first curved section 128 from a collapsed position (as shown in FIGS. 2A-2D) in which a second edge 122*b* of the side expanding portion 122 is adjacent to the first side support rail 118*a* to a deployed position (as shown in FIGS. 4A-4G) in which the first curved section 128 is raised to a position perpendicular to the first top rail 126*a*. The hydraulic unit 140 may exert controlled force to cause the first curved section 128 to transition between said two distinct positions. In its collapsed position, the second edge 122*b* of the side expanding portion 122 lies in proximity to the first side support rail 118*a*, ensuring that the expandable food cart 100 maintains a compact profile when the shading unit is not in use. Upon activation, the hydraulic unit 140 initiates a motion that pivots the first curved section 128 around the first bar hinge 130*a*. This action elevates the first curved section 128, moving it from the collapsed position to the deployed position. In the deployed position, the first curved section 128 is oriented such that it stands perpendicular to the first top rail 126*a***.

Also, as shown, the side expanding portion 122 further includes a plurality of folding panels 142 connected to the first curved section 128. These folding panels 142 play a role in extending the coverage and functionality of the side expanding portion 122, providing additional shade and protection when deployed. The side expanding portion 122 also includes a three-fold umbrella mechanism 144 connected to the plurality of folding panels 142. The three-fold umbrella mechanism 144 is configured to move the plurality of folding panels 142 from a collapsed configuration (as shown in FIGS. 2A-2D) in which the plurality of folding panels 142 are folded adjacent to the first curved section 128 to a deployed configuration (as shown in FIGS. 4A-4G) in which the plurality of folding panels 142 extend outwardly from the first curved section 128. The side expanding portion 122 further includes at least one support rod 146 (as better shown in FIG. 4A) connected between the third frame structure 116 and the expandable shading unit 120. The support rod 146 is configured to support the second edge **122*b* of the side expanding portion 122. In the collapsed configuration, the folding panels 142 are folded and positioned adjacent to the first curved section 128, maintaining a compact and streamlined profile of the expandable food cart 100, as required for minimizing the spatial footprint when the expandable shading unit 120 is not in use. In the deployed configuration, the folding panels 142 increase the shaded area provided by the side expanding portion 122, as may be desired during the vending operation of the expandable food cart 100. In such deployed configuration, the support rod 146 upholds the side expanding portion 122, ensuring that the expandable shading unit 120** remains stable and secure during use.

Further, in the expandable food cart 100, the utility box 150 is utilized to optimize space utilization and accessibility of essential vending utilities. As may be understood from FIG. 1B, the utility box 150 of the expandable food cart 100 is located in the front end cross section **10*a* between the first side 110*a* of the collapsible frame 110 and the second side 110*b* of the collapsible frame 110. This placement provides that the utility box 150 is both secure within the structure of the expandable food cart 100 and easily accessible to the user. The location of the utility box 150 at the front end of the pick-up truck bed 10, generally near a cab of the vehicle 12, aids with efficient use of space that may otherwise be underutilized in mobile vending setups. The utility box 150 may commonly be used for storing essential operational utilities, which may include, but not limited to, water tanks, gas tanks for cooking equipment, refrigeration units for keeping food items fresh, and motors or electrical equipment necessary for the operation of the expandable food cart 100. The utility box 150 is typically incorporated to optimize space utilization within the expandable food cart 100, ensuring that these essential items are stored safely and accessibly, thereby supporting the efficient operation of the expandable food cart 100**.

Figure 1E:
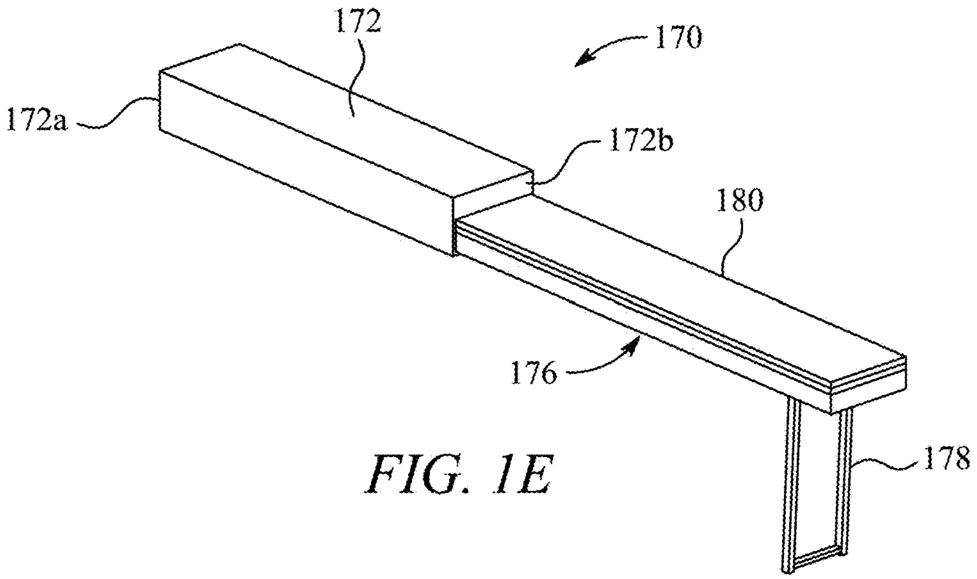
FIG. 1E is an exemplary diagram of an expandable work surface of the expandable food cart, according to certain embodiments.
Figure 1F:
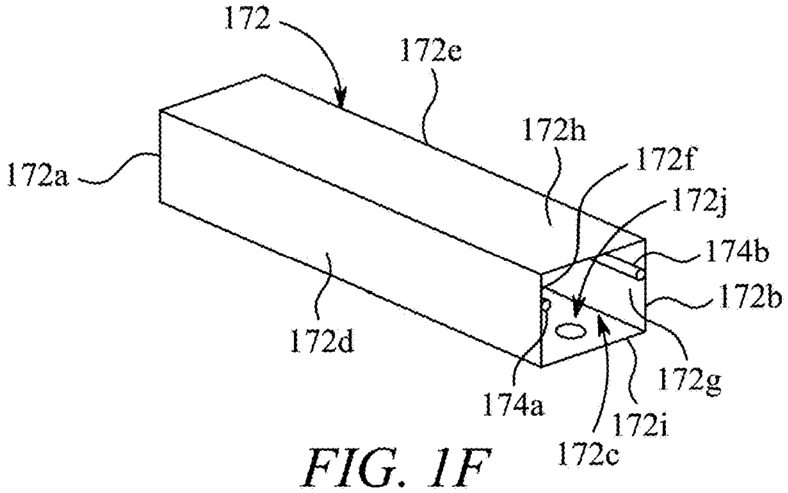
FIG. 1F is an exemplary diagram of a cabinet of the expandable work surface, according to certain embodiments.
Figure 1G:
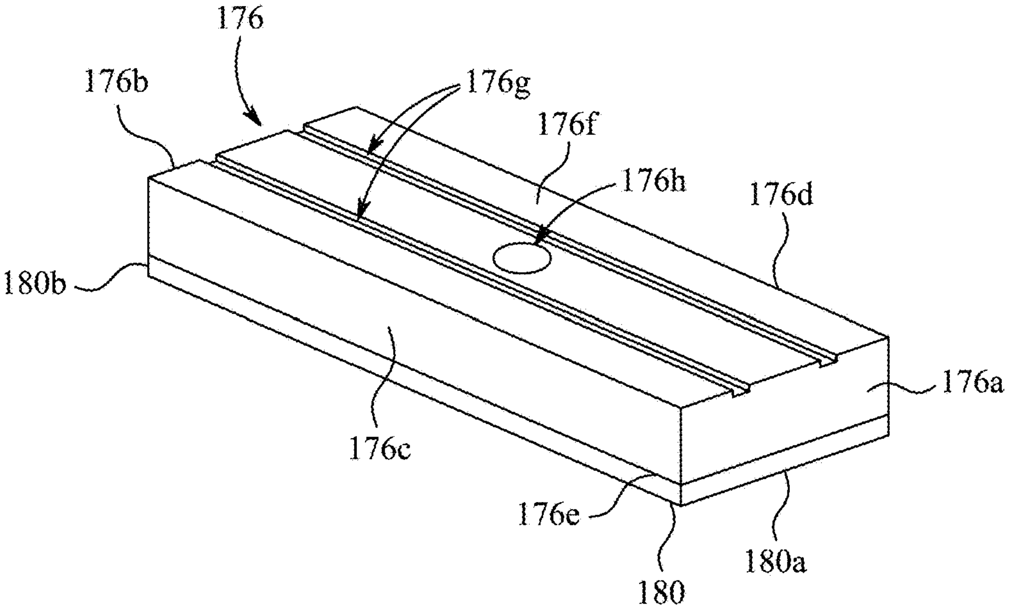
FIG. 1G is an exemplary diagram of a drawer of the expandable work surface, according to certain embodiments.
Figure 1H:
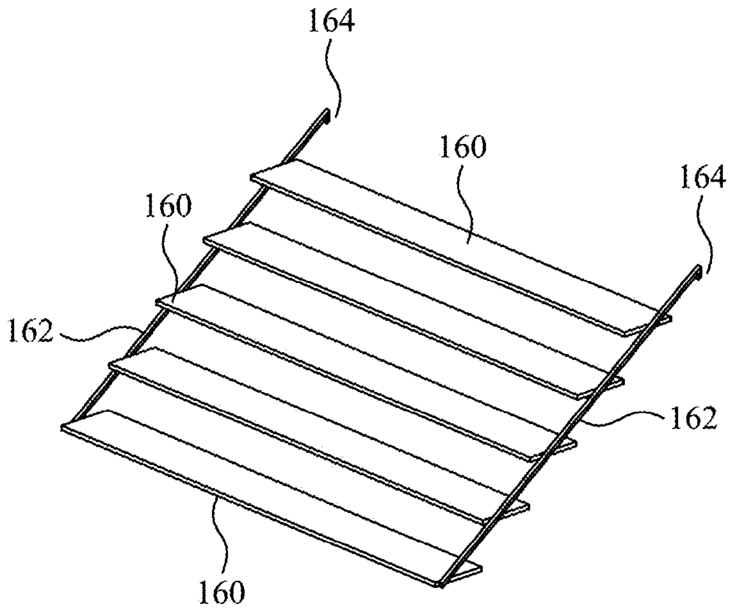
FIG. 1H is an exemplary diagram of collapsible shelves of the expandable food cart, according to certain embodiments.
Figure 2A:
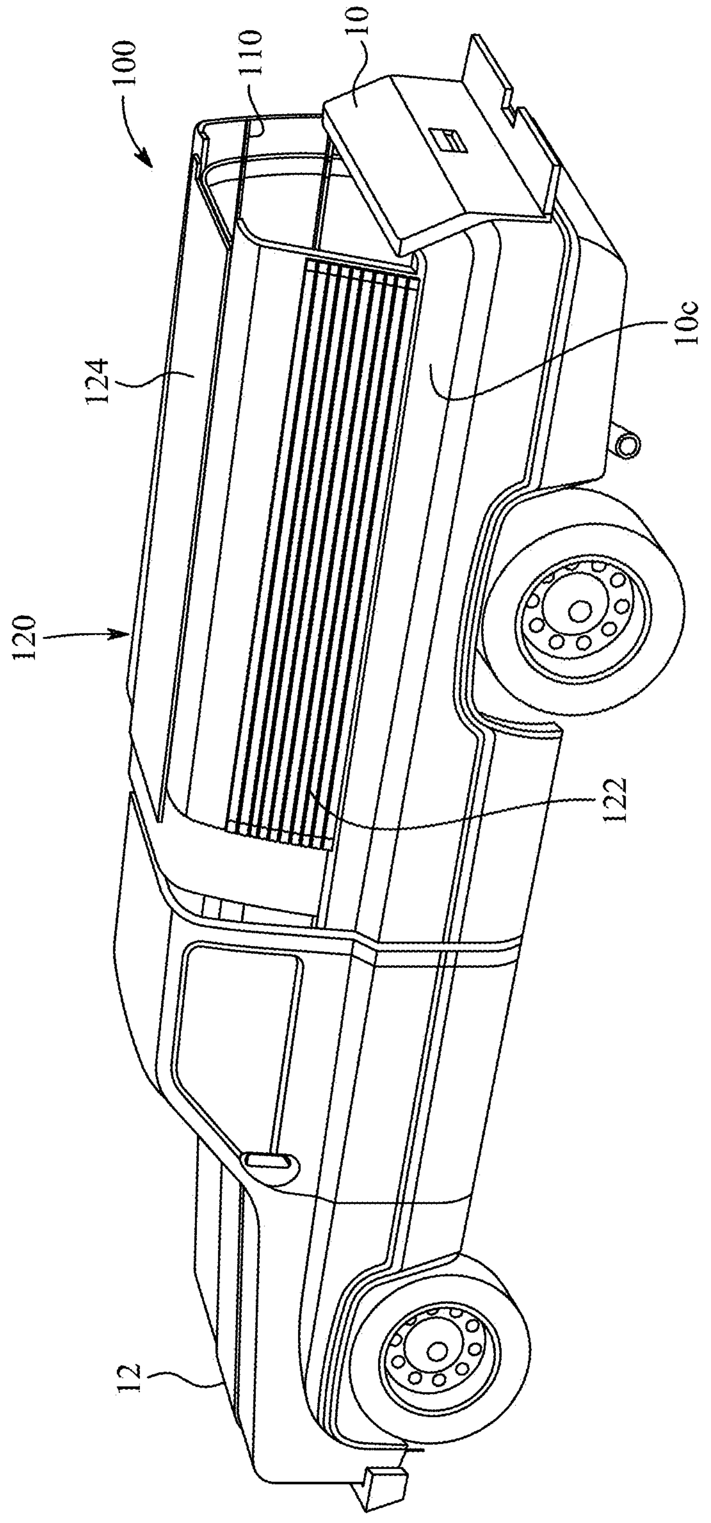
FIG. 2A is an exemplary perspective view diagram of the expandable food cart installed in the pick-up truck bed and disposed in a non-deployed configuration thereof, according to certain embodiments.
Figure 2B:
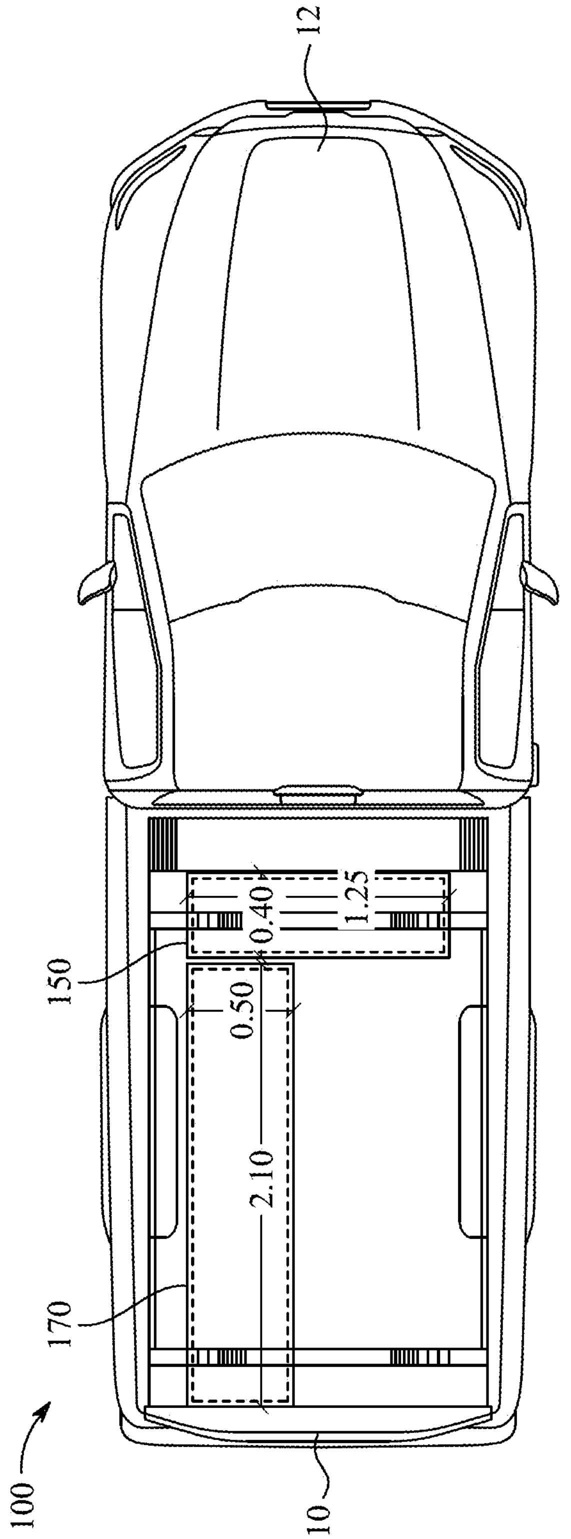
FIG. 2B is an exemplary top planar view diagram of the expandable food cart as shown in FIG. 2A, according to certain embodiments.
Figure 2C:
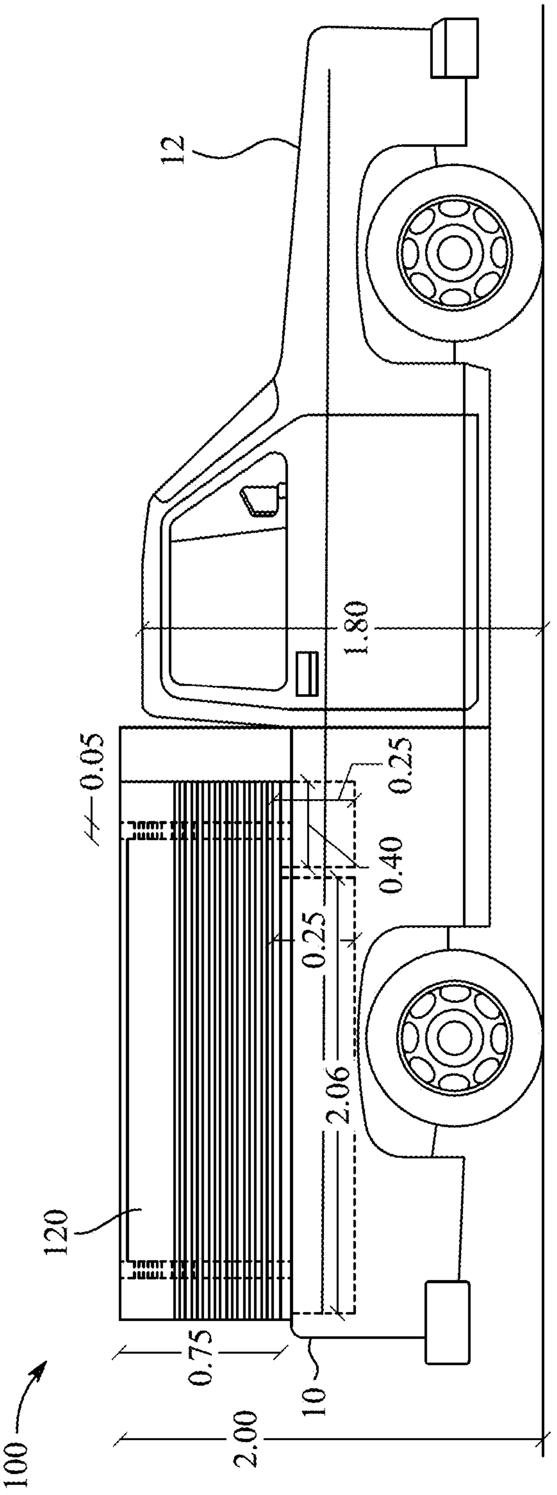
FIG. 2C is an exemplary side planar view diagram of the expandable food cart as shown in FIG. 2A, according to certain embodiments.
Figure 2D:
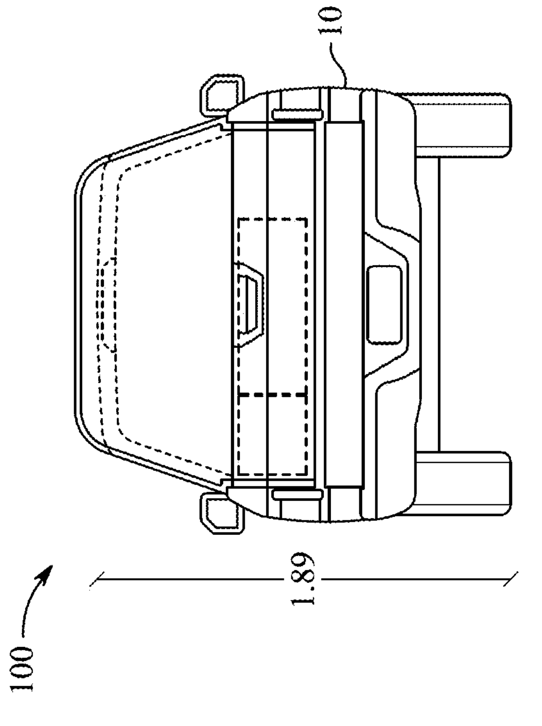
FIG. 2D is an exemplary back planar view diagram of the expandable food cart as shown in FIG. 2A, according to certain embodiments.
Figure 3A:
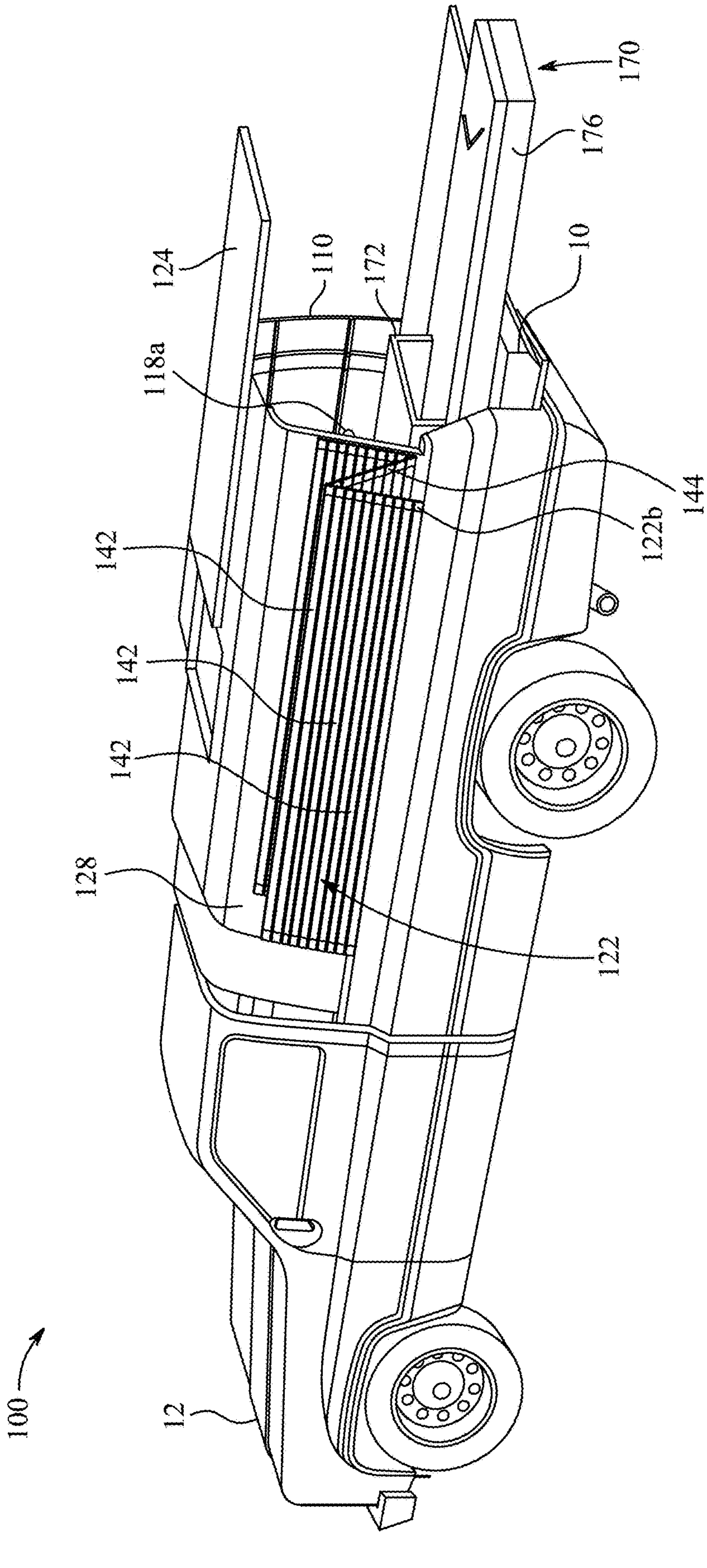
FIG. 3A is an exemplary perspective view diagram of the expandable food cart installed in the pick-up truck bed and disposed in a partially-deployed configuration thereof, according to certain embodiments.
Figure 3B:
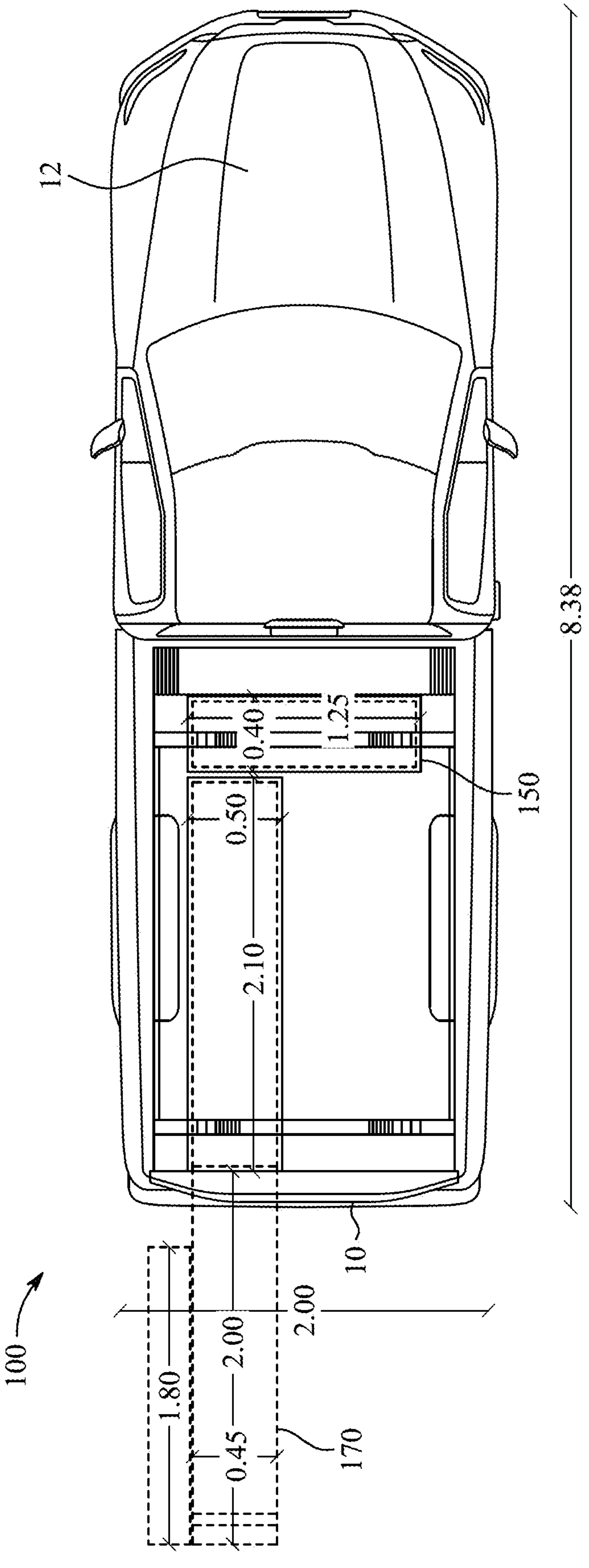
FIG. 3B is an exemplary top planar view diagram of the expandable food cart as shown in FIG. 3A, according to certain embodiments.
Figure 3C:
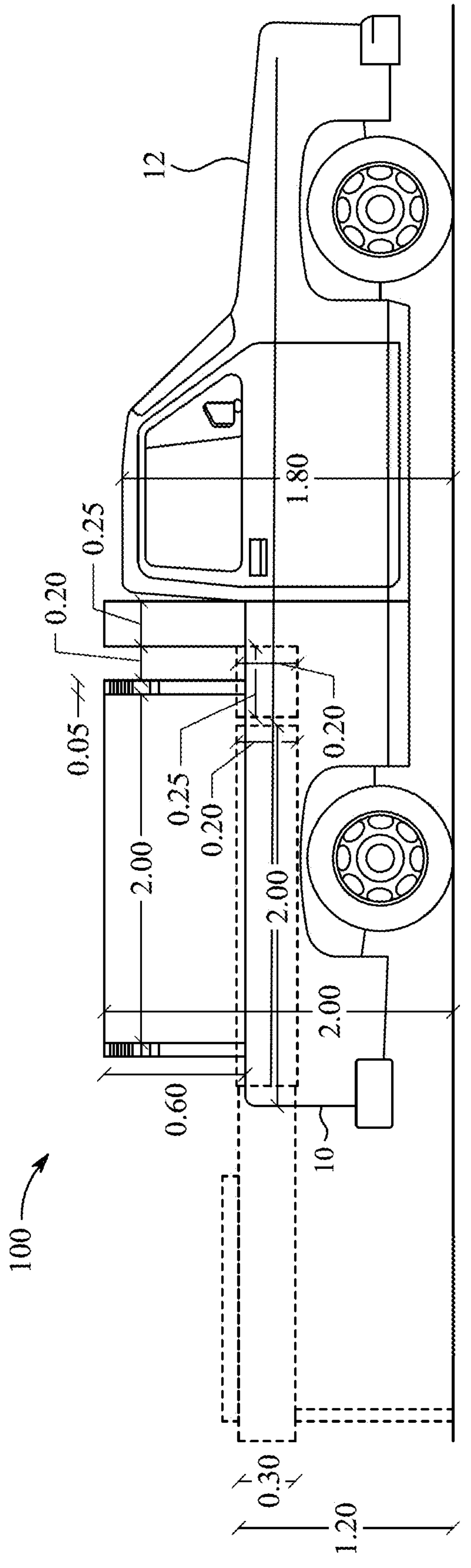
FIG. 3C is an exemplary side planar view diagram of the expandable food cart as shown in FIG. 3A, according to certain embodiments.
Figure 3D:
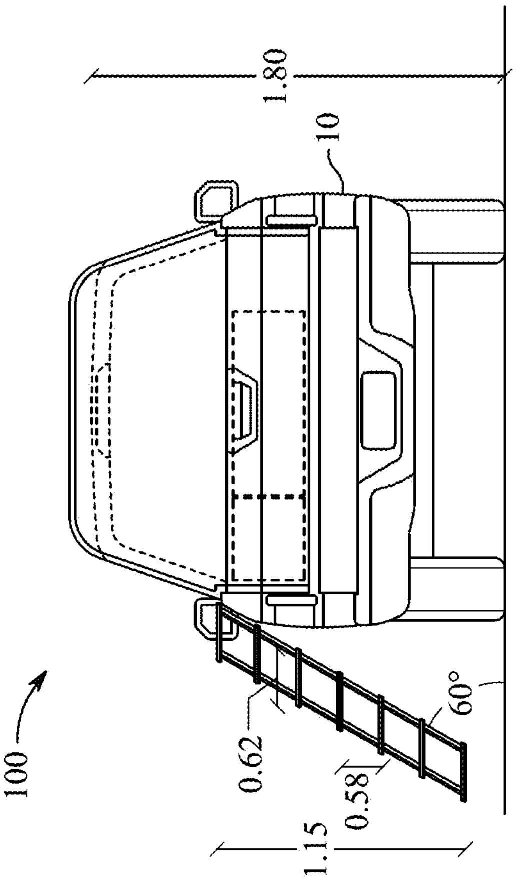
FIG. 3D is an exemplary back planar view diagram of the expandable food cart as shown in FIG. 3A, according to certain embodiments.

Also, as shown in FIGS. 1B and 1H, in conjunction with FIG. 4F, the collapsible shelves 160 include ladder-like side rails 162. The ladder-like side rails 162 hold the collapsible shelves 160 in one of a collapsed configuration in which the collapsible shelves 160 and the ladder-like side rails 162 are in a common plane and in a deployed position in which the collapsible shelves 160 extend at an angle in a range of about 70 degrees to about 90 degrees from the common plane. That is, the ladder-like side rails 162 and the collapsible shelves 160 are designed to align in the common plane when in the collapsed configuration, which ensures that the collapsible shelves 160 and the ladder-like side rails 162 present a flat, compact profile, facilitating easy storage and transport within the pick-up truck bed 10 when the vending operations are not active. Further, the collapsible shelves 160 can be deployed to extend outwardly from the ladder-like side rails 162, creating an angled display and storage surface. This deployed position, with angular deployment of the collapsible shelves 160, provides an ergonomic and accessible platform for displaying merchandise or food items, enhancing ability of the expandable food cart 100 to display such products effectively.

The collapsible shelves 160 also include a hook 164 on a top end 162*a* of each of the ladder-like side rails 162. The hooks 164 are configured to extend over the sidewall 10*c* of the pick-up truck bed 10. The hooks 164 are specifically designed to securely latch onto the sidewall 10*c* of the pick-up truck bed 10. The use of the hooks 164 ensures that the collapsible shelves 160, when deployed, are firmly anchored to the pick-up truck bed 10, providing stability to the collapsible shelves 160. Such configuration maintains the structural integrity of the collapsible shelves 160 during vending operations, especially in outdoor environments where external factors such as wind or uneven terrain could affect the stability of a less securely anchored shelves.

Figure 4G:
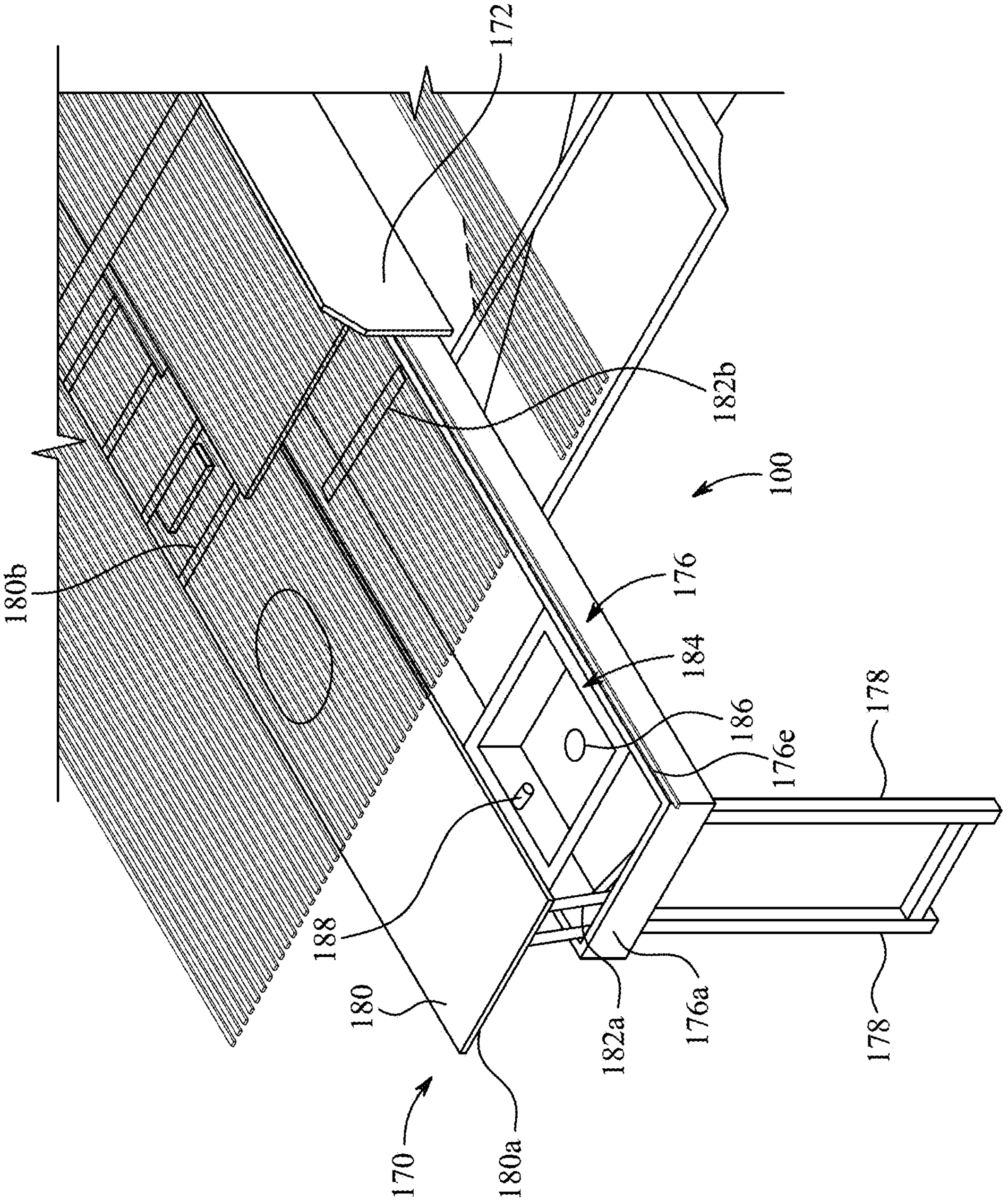
FIG. 4G is an exemplary partial back perspective view diagram of the expandable food cart in the deployed configuration showing details of the expandable work surface therein, according to certain embodiments.

Furthermore, in the expandable food cart 100, the expandable work surface 170 is designed to provide a versatile and efficient area for food preparation and service. Referring to FIG. 1B, FIG. 1E and FIG. 4G in combination, as illustrated, the expandable work surface 170 includes a cabinet 172 and a drawer 176. Herein, the drawer 176 is arranged to slide within the cabinet 172. The sliding arrangement of the drawer 176 inside the cabinet 172 facilitates efficient use of space, aiding with the storage of a wide range of items while keeping them readily accessible during vending operations. This design feature ensures that the work space provided by the drawer 176 is easily accessible when required and can be neatly pushed away to maintain an organized and clutter-free work area, providing the users of the expandable food cart 100 with greater ease and efficiency.

Specifically, as shown in FIG. 1F, the cabinet 172 has a cabinet first end 172*a* and a cabinet second end 172*b*. The cabinet 172 also has a hollow interior 172*c*. The cabinet 172 further has a first cabinet sidewall 172*d* and a second cabinet sidewall 172*e*. This configuration imparts a generally cuboidal shape to the cabinet 172. The hollow interior 172*c* permits the drawer 176 to be stored away when not needed. In particular, the expandable work surface 170 includes a first drawer slide 174*a* mounted within the hollow interior 172*c* of the cabinet 172 along a first sidewall 172*f* of the hollow interior 172*c*, and a second drawer slide 174*b* mounted within the hollow interior 172*c* of the cabinet 172 along a second sidewall 172*g* of the hollow interior 172*c*. The drawer slides 174*a*, 174*b* facilitate the smooth sliding operation of the drawer 176, maximizing utility and efficiency of the expandable food cart 100. The cabinet 172 also has a top side 172*h* and a bottom side 172*i*. Further, as may be understood from FIGS. 1B and 1F in combination, the cabinet first end 172*a* is configured to connect to the straight bottom rail 112*l* of the collapsible frame 110. This configuration ensures that the cabinet 172, and thus the entire expandable work surface 170, is securely anchored to the main structural support of the expandable food cart 100, providing stability and support during use.

FIG. 1G illustrates the drawer 176 as inverted. As shown, the drawer 176 includes a drawer front end 176*a* and a drawer back end 176*b*, two drawer sidewalls 176*c* and 176*d*, a top 176*e*, and an undersurface 176*f*. This configuration imparts a generally cuboidal shape to the drawer 176. Herein, a size (or volume) of the drawer 176 is smaller than that of the cabinet 172, to facilitate the drawer 176 to be stirred therein. The drawer 176 has drawer hardware configured to connect to the first drawer slide 174*a* and the second drawer slide 174*b* so that the drawer 176 slidably moves within the hollow interior 172*c* from the cabinet first end 172*a* to the cabinet second end 172*b*. Such drawer hardware may be contemplated to include slides/channels (not shown) complementary to the drawer slide 174*a*, 174*b*, to facilitate the drawer 176 to slide in and out of the hollow interior 172*c* of the cabinet 172.

The drawer 176 further includes a pocket 176*g* located on the undersurface 176*f* of the drawer 176. The pocket 176*g* is in the form of two grooves extending along a length of the drawer 176 between the drawer front end 176*a* and the drawer back end 176*b*. The drawer 176 also includes a pair of hinged legs 178 (as shown in FIG. 1E). The pair of hinged legs 178 is configured to be located within the pocket 176*g*. In particular, the pair of hinged legs 178 are configured to move from an undeployed configuration where the pair of hinged legs 178 are flush with the undersurface 176*f* of the drawer 176 to a deployed configuration where the pair of hinged legs 178 extend ninety degrees from the drawer front end 176*a*. The transition to the deployed configuration facilitates the pair of hinged legs 178 to provide stable support to the drawer 176, effectively transforming it into a sturdy work or display surface that extends beyond the cabinet 172.

The drawer 176 of the expandable food cart 100 is designed to optimize the functionality of the expandable work surface 170. As better shown in FIG. 4G, the drawer 176 includes a top shelf 180 configured to cover at least a portion of the top 176*e* of the drawer 176. The top shelf 180 may generally be arranged as a layer on the top 176*e* of the drawer 176. The top shelf 180 has a front end 180*a* and a back end 180*b*. Here, the top shelf 180 is configured to cover at least the top 176*e* of the drawer 176 when not in use, providing a flat surface for various vending activities. The drawer 176 also includes a first spring loaded hinge 182*a* connected to the front end 180*a* of the top shelf 180 and the drawer front end 176*a*, and a second spring loaded hinge 182*b* connected to the back end 180*b* of the top shelf 180. Herein, the first spring loaded hinge 182*a* and the second spring loaded hinge 182*b* are configured to lift the top shelf 180 above the drawer 176. That is, the first spring loaded hinge 182*a* and the second spring loaded hinge 182*b* work in unison to raise the top shelf 180 above the drawer 176. This permits the top shelf 180 to be used as a versatile component of the expandable food cart 100, providing both protective covering for elements of the drawer 176 when not in use, and an additional vending surface when extended.

Referring back to FIG. 4G, as illustrated, the expandable food cart 100 further includes a sink 184 located within the drawer 176. The sink 184, installed within the drawer 176, provides a convenient location for washing and preparing food items, for vending operation of the expandable food cart 100. The expandable food cart 100 also includes a drain 186 connected to the sink 184, and a water supply fitting 188 connected to the sink 184. The drain 186 facilitates the disposal of wastewater, while the water supply fitting 188 provides a means for fresh water to be delivered to the sink 184 when needed.

The expandable food cart 100 further provides a first aperture **172*j* (as shown in FIG. 1F) located in the bottom side 172*i* of the cabinet 172, and a second aperture 176*h* (as shown in FIG. 1G) located in the undersurface 176*f* of the drawer 176. These apertures 172*j* and 176*h* are provided to accommodate the necessary plumbing. Specifically, the first aperture 172*j* is configured to receive a drain hose and a water hose (not shown). Further, the second aperture 176*h* is configured to receive the drain hose and the water hose (as extending from the first aperture 172*j*). The drain hose is configured to attach to the drain 186 and the water hose is configured to attach to the water supply fitting 188. By incorporating these features, the expandable food cart 100 facilitates the users to manage water usage effectively within the compact space of a mobile vending setup, enhancing the overall utility and convenience of the expandable food cart 100**.

In an aspect of the present disclosure, the expandable shading unit 120 may further incorporate flexible solar panels (not shown). These solar panels may be affixed to the top expanding portion 124 as well as the side expanding portion 122, to harness solar energy efficiently. Additionally, the portions on the second side **120*b* of the expandable shading unit 120, including the solid panel 134, which remains static, may also be equipped with flexible solar panels to maximize energy capture. The electricity generated by these flexible solar panels is directed towards a battery (not shown), which may be housed within the utility box 150. This stored electrical energy may then be utilized to power various components of the expandable food cart 100, such as a grill for cooking purposes, a pump for facilitating water flow to the sink 184, and other electric components. By employing solar panels in this manner, the expandable food cart 100** facilitates sustainable energy usage, reducing reliance on external power sources, and enhancing the autonomy of the mobile vending operation.

In an aspect of the present disclosure, the expandable food cart 100 may include a tracking system (not shown). The tracking system may be equipped with a Global Positioning System (GPS) receiver, a microprocessor, and an antenna. The GPS receiver is responsible for obtaining the geographical position of the expandable food cart 100 when it is stationed for vending. The microprocessor, working in conjunction with the GPS receiver, processes the location data and controls the broadcasting of the position of the expandable food cart 100. The antenna facilitates the transmission of this information, ensuring it can be communicated effectively to interested parties. The antenna may be located on top of fixed portion of the expandable shading unit 120, such as the solid panel 134, providing an unobstructed position for the antenna to broadcast signals. Alternatively, the antenna may be placed adjacent to a battery within the utility box 150, where it is protected and can operate off the stored electrical power from the battery, which is charged via solar panels or other means.

In an example, the tracking system may be configured to interface with a mobile application that can be downloaded by interested parties to their smartphones. Through this application, interested parties can conveniently locate the expandable food cart 100 in near real-time, facilitating accessibility and enhancing customer engagement. The app may provide users with the current location of the expandable food cart 100, as well as additional information such as operating hours and the menu. In an example, the tracking system may further be configured to integrate with existing food truck locator applications. By registering the expandable food cart 100 on multiple well-known food truck apps, the visibility of the expandable food cart 100 is significantly increased, facilitating it to reach a broader user base looking for mobile vending options in their vicinity.

Figure 5:
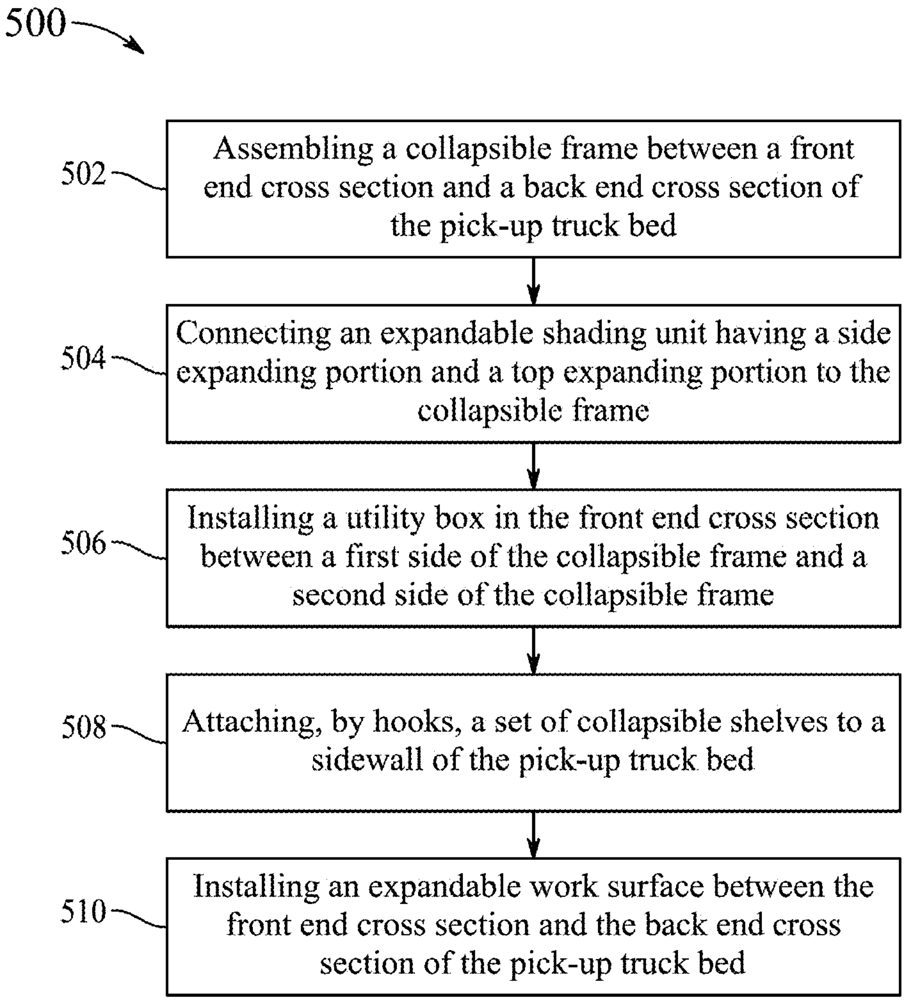
FIG. 5 is an exemplary flowchart of a method for assembling the expandable food cart in the pick-up truck bed, according to certain embodiments.

Referring to FIG. 5, the present disclosure further a method (as represented by a flowchart, referred by reference numeral 500) for assembling the expandable food cart 100 in the pick-up truck bed 10. The details of the expandable food cart 100 has been discussed in the preceding paragraphs, and thus not repeated herein for brevity of the present disclosure. The method 900 of assembling the expandable food cart 100 includes a series of steps. These steps are only illustrative, and other alternatives may be considered where one or more steps are added, one or more steps are removed, or one or more steps are provided in a different sequence without departing from the scope of the present disclosure. Various embodiments and variants disclosed above, with respect to the aforementioned expandable food cart 100 apply mutatis mutandis to the method 500 of assembling the expandable food cart 100.

At step 510, the method 500 includes assembling the collapsible frame 110 between the front end cross section **10*a* and the back end cross section 10*b* of the pick-up truck bed 10. This involves positioning and securing the collapsible frame 110 between the front end cross section 10*a* and the back end cross section 10*b* of the pick-up truck bed 10. The collapsible frame 110 is aligned such that it spans the length of the pick-up truck bed 10**, providing a foundational structure on which the other components may be mounted.

At step 520, the method 500 includes connecting the expandable shading unit 120 having the side expanding portion 122 and the top expanding portion 124 to the collapsible frame 110. That is, once the collapsible frame 110 is in place, the expandable shading unit 120 is connected to it. The expandable shading unit 120, which includes the side expanding portion 122 and the top expanding portion 124, is affixed to the collapsible frame 110. This attachment ensures that the expandable shading unit 120 is adequately supported by the collapsible frame 110, permitting it to expand and collapse, as required.

At step 530, the method 500 includes installing the utility box 150 in the front end cross section **10*a* between the first side 110*a* of the collapsible frame 110 and the second side 110*b* of the collapsible frame 110. The utility box 150 is positioned within the front end cross section 10*a* of the pick-up truck bed 10 and secured between the first side 110*a* and the second side 110*b* of the collapsible frame 110. The utility box 150** serves as a storage for essential vending utilities and is accordingly placed where it can be easily accessed for both usage and maintenance.

At step 540, the method 500 includes attaching, by the hooks 164, the set of collapsible shelves 160 to the sidewall **10*c* of the pick-up truck bed 10. The hooks 164 located at the top end of the ladder-like side rails 162 of the collapsible shelves 160 and are used to secure the collapsible shelves 160 to the sidewall 10*c* of the pick-up truck bed 10. This ensures that the collapsible shelves 160** are stable and can support the weight of the items displayed or stored on them during use.

At step 550, the method 500 includes installing the expandable work surface 170 between the front end cross section 10*a* and the back end cross section 10*b* of the pick-up truck bed 10. Once in position, the expandable work surface 170 is secured to the collapsible frame 110. This is typically achieved by fastening mechanisms designed to lock the work surface into place, preventing any lateral or vertical movement that could disrupt the vending activities or compromise safety. The expandable work surface 170 is utilized for the vending operations, providing a stable area for food preparation and service.

In the method 500, assembling the collapsible frame 110 includes installing at least three frame structures. Such assembly includes attaching the first frame structure 112 to the front end cross section 10*a* of the pick-up truck bed 10. This attachment establishes the base of the collapsible frame 110 within the pick-up truck bed 10. Such assembly further includes attaching the second frame structure 114 to the first frame structure 112. This involves aligning and securing the second frame structure 114 so that it connects to and extends from the first frame structure 112, forming the midsection of the collapsible frame 110. Such assembly further includes attaching the third frame structure 116 to the back end cross section 10*b* of the pick-up truck bed 10. This secures the rear-most point of the collapsible frame 110, completing the basic outline of the collapsible frame 110 within the pick-up truck bed 10. Such assembly further includes connecting the first side support rail 118*a* to the first side 114*a* of the second frame structure 114 and to the first side 116*a* of the third frame structure 116 at the height 'H' equal to about the depth 'D' of the pick-up truck bed 10; and connecting the second side support rail 118*b* to the second side 114*b* of the second frame structure 114 and to the second side 116*b* of the third frame structure 116 at the height 'H' equal to about the depth 'D' of the pick-up truck bed 10. That is, once the three frame structures 112-116 are in place, the side support rails 118*a*, 118*b* are connected which reinforces the collapsible frame 110 and maintains its width, providing the structural stability to the collapsible frame 110. Such assembly further includes connecting the first top support rail 118*c* to the first top portion 114*c* of the second frame structure 114 and to the corresponding first top portion 116*c* of the third frame structure 116, wherein the first top portion 114*c* and the corresponding first top portion 116*c* are located near the first sides 114*a*, 116*a*; and connecting the second top support rail 118*d* to the second top portion 114*d* of the second frame structure 114 and to the corresponding second top portion 116*d* of the third frame structure 116. Herein, the second top portion 114*d* and the corresponding second top portion 116*d* are located near the second sides 114*b*, 116*b*. The top support rails 118*c*, 118*d* provide support for the collapsible frame 110 and serve as attachment points for other components of the expandable food cart 100, such as the expandable shading unit 120.

In the method 500, connecting the expandable shading unit 120 to the collapsible frame 110 includes various sub-steps. This assembly ensures that the expandable shading unit 120 is securely affixed to the collapsible frame 110, providing the necessary stability and support. Such assembly includes connecting the first top rail 126*a* of the expandable shading unit 120 to the second frame structure 114. The first top rail 126*a* serves as an anchor point, providing a connection to the second frame structure 114 for deployment of the expandable shading unit 120. Such assembly further includes connecting the second top rail 126*b* of the expandable shading unit 120 to the third frame structure 116. This further secures the expandable shading unit 120 and ensures that it spans the entire length of the collapsible frame 110. Such assembly further includes connecting the first curved section 128, located on the first side 120*a* of the expandable shading unit 120 between the first top rail 126*a* and the second top rail 126*b*, to the first top rail 126*a* by the first bar hinge 130*a* and to the second top rail 126*b* by the second bar hinge 130*b*. This ensures that the first curved section 128 is securely attached and can be raised or lowered to provide adjustable shading. Such assembly further includes connecting the second curved section 132 located on the second side 120*b* of the expandable shading unit 120 to the second top rail 126*b*. This connection mirrors the one on the first side 120*a* of the expandable shading unit 120, providing symmetrical support and functionality to the expandable shading unit 120. Such assembly further includes connecting the solid panel 134 of the second curved section 132 to the second side support rail 118*b*. This connection adds to the structural integrity of the expandable shading unit 120 and also provides a solid, non-collapsible area that contributes to the overall shade coverage of the expandable shading unit 120.

The method 500 further includes connecting the hydraulic unit 140 to the second frame structure 114 and the first bar hinge 130*a*. The hydraulic unit 140 is configured to move the first curved section 128 from the collapsed position in which the second edge 122*b* of the side expanding portion 122 is adjacent to the first side support rail 118*a* to the deployed position in which the first curved section 128 is raised to the position perpendicular to the first top rail 126*a*. The hydraulic unit 140 is attached to the second frame structure 114 and is also connected to the first bar hinge 130*a*, which facilitates the movement of the first curved section 128. Once the hydraulic unit 140 is securely in place, it may be used to facilitate the transition of the first curved section 128 between the collapsed position and the deployed position.

The method 500 further includes inserting the top expanding portion 124 into the first D-shaped track 136*a* located within the second edge 128*b* of the first curved section 128 and into the second D-shaped track 136*b* located within the second edge 132*b* of the second curved section 132, wherein the first D-shaped track 136*a* and the second D-shaped track 136*b* are configured to slidingly support the top expanding portion 124 to move from the non-deployed configuration in which the top expanding portion 124 abuts the first top rail 126*a* and the deployed configuration in which two thirds of the top expanding portion 124 extends past the second top rail 126*b*. This involves aligning the top expanding portion 124 with the first D-shaped track 136*a* and the second D-shaped track 136*b*. Once aligned, the top expanding portion 124 is inserted into both the first D-shaped track 136*a* and the second D-shaped track 136*b*. The D-shaped tracks 136*a*, 136*b* facilitate the transition of the expandable shading unit 120 from the non-deployed configuration to the deployed configuration, providing variable shading options for the expandable food cart 100.

The method 500 further includes connecting the three-fold umbrella mechanism 144 to the plurality of folding panels 142 attached to the first curved section 128, wherein the three-fold umbrella mechanism 144 is configured to move the plurality of folding panels 142 from the collapsed configuration in which the plurality of folding panels 142 are folded adjacent to the first curved section 128 to the deployed configuration in which the plurality of folding panels 142 extend outwardly from the first curved section 128. Initially, in the collapsed configuration, the folding panels 142 remain folded and in close proximity to the first curved section 128, ensuring that the expandable food cart 100 maintains a compact profile for mobility and storage. The three-fold umbrella mechanism 144, once connected, activates the expansion of the folding panels 142. The method 500 also includes connecting at least one support rod 146 between the third frame structure 116 and the expandable shading unit 120 to support the second edge 122*b* of the side expanding portion 122. The support rod 146 provides a link between the third frame structure 116 and the expandable shading unit 120. By securing this connection, the support rod 146 ensures that the expanded structure remains stable.

The method 500 further includes connecting the cabinet 172 of the expandable work surface 170 to the straight bottom rail 112*l*, 114*l*, 116*l* of the collapsible frame 110. This connection ensures that the cabinet 172 is firmly anchored within the structure of the expandable food cart 100, providing a stable base for the expandable work surface 170. The method 500 also includes pulling the drawer 176 located within the cabinet 172 into the deployed configuration in which the drawer 176 extends beyond the back cross section of the pick-up truck bed 10. In this extended state, the drawer 176 protrudes beyond the back end cross section 10*b* of the pick-up truck bed 10, providing additional workspace or storage area that is easily accessible from outside the pick-up truck bed 10. The method 500 also includes moving the pair of hinged legs 178 located within the pocket 176*g* on the undersurface 176*f* of the drawer 176 from the undeployed configuration where the pair of hinged legs 178 are flush with the undersurface 176*f* of the drawer 176 to the deployed configuration where the pair of hinged legs 178 extend ninety degrees from the drawer front end 176*a* to support the drawer 176. This provides support for the drawer 176, ensuring that it remains stable and secure when in use, thereby enhancing the functionality and versatility of the expandable work surface 170 within the expandable food cart 100.

The method 500 further includes raising the front end 180*a* of the top shelf 180 configured to cover at least the portion of the drawer 176 by opening the first spring loaded hinge 182*a* connected to the front end 180*a* of the top shelf 180 and the drawer front end 176*a*. This movement exposes the contents of the drawer 176, making them accessible for use, while also potentially providing additional vertical space above the drawer 176. The method 500 also includes raising the back end 180*b* of the top shelf 180 by opening the second spring loaded hinge 182*b* connected to the back end 180*b* of the top shelf 180. This effectively raises the top shelf 180, permitting it to cover a portion of the drawer 176 when in the closed position and to be lifted clear when accessing the drawer 176 or when additional space is required.

The expandable food cart 100 and the method 500 of the present disclosure provide several distinct advantages over the known prior art in the field of mobile vending units and food carts, especially when considering the flexibility, functionality, and aesthetic appeal required for modern street vending. The inclusion of the collapsible frame 110, the expandable shading unit 120 with the side expanding portion 122 and the top expanding portion 124, and the set of collapsible shelves 160 provides that the expandable food cart 100 can be easily adapted to varying vending environments and customer needs. The design of the expandable work surface 170, which incorporates the cabinet 172 with the slidably arranged drawer 176, maximizes the use of available space within the pick-up truck bed 10, providing a compact setup for vending operations. The method 500 facilitates a systematic assembly of the expandable food cart 100, providing that each component is optimally positioned for easy access and efficient use, thereby enhancing the overall functionality of the expandable food cart 100.

A first embodiment describes the expandable food cart 100 for use in the pick-up truck bed 10, comprising the collapsible frame 110 configured to conform with the front end cross section 10*a* and the back end cross section 10*b* of the pick-up truck bed 10, the expandable shading unit 120 having the side expanding portion 122 and the top expanding portion 124, the utility box 150 located in the front end cross section 10*a* between the first side 110*a* of the collapsible frame 110 and the second side 110*b* of the collapsible frame 110, collapsible shelves 160 configured to attach to the sidewall 10*c* of the pick-up truck bed 10, and the expandable work surface 170.

The expandable food cart 100, wherein the collapsible frame 110 comprises at least three frame structures, including the first frame structure 112 configured to attach to the front end cross section 10*a* of the pick-up truck bed 10, the second frame structure 114 configured to attach to the first frame structure 112, the third frame structure 116 configured to attach to the back end cross section 10*b* of the pick-up truck bed 10, the first side support rail 118*a* configured to connect the first side 114*a* of the second frame structure 114 to the first side 116*a* of the third frame structure 116 at the height 'H' equal to about the depth 'D' of the pick-up truck bed 10, the second side support rail 118*b* configured to connect the second side 114*b* of the second frame structure 114 to the second side 116*b* of the third frame structure 116 at the height 'H' equal to about the depth 'D' of the pick-up truck bed 10, the first top support rail 118*c* configured to connect the first top portion 114*c* of the second frame structure 114 to the corresponding first top portion 116*c* of the third frame structure 116, wherein the first top portion 114*c* and the corresponding first top portion 116*c* are located near the first sides 114*a*, 116*a*, and the second top support rail 118*d* configured to connect the second top portion 114*d* of the second frame structure 114 to the corresponding second top portion 116*d* of the third frame structure 116, wherein the second top portion 114*d* and the corresponding second top portion 116*d* are located near the second sides 114*b*, 116*b*.

The expandable food cart 100, wherein each frame structure 112, 114, 116 has the upper section 112*e*, 114*e*, 116*e* having the isosceles trapezoidal shape with curved corners, which includes the straight top portion 112*f*, 114*f*, 116*f*, the angled first side portion 112*g*, 114*g*, 116*g* and the angled second side portion 112*h*, 114*h*, 116*h*, and the lower section 112*i*, 114*i*, 116*i* including the vertical first side portion 112*j*, 114*j*, 116*j*, the vertical second side portion 112*k*, 114*k*, 116*k*, and the straight bottom rail 112*l*, 114*l*, 116*l* connected between the bottom end 112*m*, 114*m*, 116*m* of the vertical first side portion 112*j*, 114*j*, 116*j* and the bottom end 112*n*, 114*n*, 116*n* of the vertical second side portion 112*k*, 114*k*, 116*k*, wherein the straight top portion 112*f*, 114*f*, 116*f* of the upper section 112*e*, 114*e*, 116*e* is configured to connect to and support the expandable shading unit 120 and the straight bottom rail 112*l*, 114*l*, 116*l* is configured to be mounted in the pick-up truck bed 10.

The expandable food cart 100, wherein the expandable shading unit 120 comprises the first top rail 126*a* configured to connect to the second frame structure 114, the second top rail 126*b* configured to connect to the third frame structure 116, the first curved section 128 located on the first side 120*a* of the expandable shading unit 120 between the first top rail 126*a* and the second top rail 126*b*, wherein the first curved section 128 is connected to the first top rail 126*a* by the first bar hinge 130*a* and to the second top rail 126*b* by the second bar hinge 130*b*, wherein the first edge 122*a* of the side expanding portion 122 is connected to the first edge 128*a* of the first curved section 128, the second curved section 132 located on the second side 120*b* of the expandable shading unit 120 between the first top rail 126*a* and the second top rail 126*b*, a solid panel 134 connected to the first edge 132*a* of the second curved section 132, wherein the solid panel 134 is connected to the second side support rail 118*b*, the first D-shaped track 136*a* located within the second edge 128*b* of the first curved section 128, wherein the second edge 128*b* of the first curved section 128 is located towards the center line 138 of the expandable shading unit 120 which extends from the first top rail 126*a* to the second top rail 126*b*, and the second D-shaped track 136*b* located within the second edge 132*b* of the second curved section 132, wherein the second edge 132*b* of the second curved section 132 is located towards the center line 138 of the expandable shading unit 120.

The expandable food cart 100, wherein the first D-shaped track 136*a* and the second D-shaped track 136*b* are configured to slidingly support the top expanding portion 124 to move from the non-deployed configuration in which the top expanding portion 124 abuts the first top rail 126*a* and the deployed configuration in which two thirds of the top expanding portion 124 extends past the second top rail 126*b*.

The expandable food cart 100, wherein the side expanding portion 122 comprises the hydraulic unit 140 connected to the second frame structure 114 and the first bar hinge 130*a*, wherein the hydraulic unit 140 is configured to move the first curved section 128 from the collapsed position in which the second edge 122*b* of the side expanding portion 122 is adjacent to the first side support rail 118*a* to the deployed position in which the first curved section 128 is raised to the position perpendicular to the first top rail 126*a*.

The expandable food cart 100, wherein the side expanding portion 122 further comprises the plurality of folding panels 142 connected to the first curved section 128, a three-fold umbrella mechanism 144 connected to the plurality of folding panels 142, wherein the three-fold umbrella mechanism 144 is configured to move the plurality of folding panels 142 from the collapsed configuration in which the plurality of folding panels 142 are folded adjacent to the first curved section 128 to the deployed configuration in which the plurality of folding panels 142 extend outwardly from the first curved section 128, and at least one support rod 146 connected between the third frame structure 116 and the expandable shading unit 120, wherein the support rod 146 is configured to support the second edge 122*b* of the side expanding portion 122.

The expandable food cart 100, wherein the expandable work surface 170 comprises a cabinet 172 having the cabinet first end 172*a*, the cabinet second end 172*b*, the hollow interior 172*c*, the first cabinet sidewall 172*d* and the second cabinet sidewall 172*e*, wherein the cabinet first end 172*a* is configured to connect to the straight bottom rail 112*l* of the collapsible frame 110, the first drawer slide 174*a* mounted within the hollow interior 172*c* of the cabinet 172 along the first sidewall 172*f* of the hollow interior 172*c*, a second drawer slide 174*b* mounted within the hollow interior 172*c* of the cabinet 172 along the second sidewall 172*g* of the hollow interior 172*c*, the drawer 176 having drawer hardware configured to connect to the first drawer slide 174*a* and the second drawer slide 174*b* so that the drawer 176 slidably moves within the hollow interior 172*c* from the cabinet first end 172*a* to the cabinet second end 172*b*.

The expandable food cart 100, wherein the drawer 176 further comprises the drawer front end 176*a*, the pocket 176*g* located on the undersurface 176*f* of the drawer 176, and the pair of hinged legs 178 located within the pocket 176*g*, wherein the pair of hinged legs 178 are configured to move from the undeployed configuration where the pair of hinged legs 178 are flush with the undersurface 176*f* of the drawer 176 to the deployed configuration where the pair of hinged legs 178 extend ninety degrees from the drawer front end 176*a*.

The expandable food cart 100, wherein the drawer 176 further comprises the top shelf 180 configured to cover at least the portion of the top 176*e* of the drawer 176, the first spring loaded hinge 182*a* connected to the front end 180*a* of the top shelf 180 and the drawer front end 176*a*, and the second spring loaded hinge 182*b* connected to the back end 180*b* of the top shelf 180, wherein the first spring loaded hinge 182*a* and the second spring loaded hinge 182*b* are configured to lift the top shelf 180 above the drawer 176.

The expandable food cart 100, further comprising the sink 184 located within the drawer 176, the drain 186 connected to the sink 184, the water supply fitting 188 connected to the sink 184, the first aperture 172*j* located in the bottom side 172*i* of the cabinet 172 configured to receive the drain hose and the water hose, and the second aperture 176*h* located in the undersurface 176*f* of the drawer 176, wherein the second aperture 176*h* is configured to receive the drain hose and the water hose, wherein the drain hose is configured to attach to the drain 186 and the water hose is configured to attach to the water supply fitting 188.

The expandable food cart 100, wherein the collapsible shelves 160 comprise ladder-like side rails 162 which hold the collapsible shelves 160 in one of the collapsed configuration in which the collapsible shelves 160 and ladder-like side rails 162 are in the common plane and in the deployed position in which the collapsible shelves 160 extend at the angle in the range of about 70 degrees to about 90 degrees from the common plane, and the hook 164 on the top end 162*a* of each of the ladder-like side rails 162, wherein the hooks 164 are configured to extend over the sidewall of the pick-up truck bed 10.

A second embodiment describes the method 500 for assembling the expandable food cart 100 in the pick-up truck bed 10, comprising assembling the collapsible frame 110 between the front end cross section 10*a* and the back end cross section 10*b* of the pick-up truck bed 10, connecting the expandable shading unit 120 having the side expanding portion 122 and the top expanding portion 124 to the collapsible frame 110, installing the utility box 150 in the front end cross section 10*a* between the first side 110*a* of the collapsible frame 110 and the second side 110*b* of the collapsible frame 110, attaching, by hooks 164, the set of collapsible shelves 160 to the sidewall 10*c* of the pick-up truck bed 10, and installing the expandable work surface 170 between the front end cross section 10*a* and the back end cross section 10*b* of the pick-up truck bed 10.

The method 500, wherein assembling the collapsible frame 110 comprises installing at least three frame structures, including attaching the first frame structure 112 to the front end cross section 10*a* of the pick-up truck bed 10, attaching the second frame structure 114 to the first frame structure 112, attaching the third frame structure 116 to the back end cross section 10*b* of the pick-up truck bed 10, connecting the first side support rail 118*a* to the first side 114*a* of the second frame structure 114 and to the first side 116*a* of the third frame structure 116 at the height ‘H’ equal to about the depth ‘D’ of the pick-up truck bed 10, connecting the second side support rail 118*b* to the second side 114*b* of the second frame structure 114 and to the second side 116*b* of the third frame structure 116 at the height ‘H’ equal to about the depth ‘D’ of the pick-up truck bed 10, connecting the first top support rail 118*c* to the first top portion 114*c* of the second frame structure 114 and to the corresponding first top portion 116*c* of the third frame structure 116, wherein the first top portion 114*c* and the corresponding first top portion 116*c* are located near the first sides 114*a*, 116*a*, and connecting the second top support rail 118*d* to the second top portion 114*d* of the second frame structure 114 and to the corresponding second top portion 116*d* of the third frame structure 116, wherein the second top portion 114*d* and the corresponding second top portion 116*d* are located near the second sides 114*b*, 116*b*.

The method 500, wherein connecting the expandable shading unit 120 to the collapsible frame 110 comprises connecting the first top rail 126*a* of the expandable shading unit 120 to the second frame structure 114, connecting the second top rail 126*b* of the expandable shading unit 120 to the third frame structure 116, connecting the first curved section 128, located on the first side 120*a* of the expandable shading unit 120 between the first top rail 126*a* and the second top rail 126*b*, to the first top rail 126*a* by the first bar hinge 130*a* and to the second top rail 126*b* by the second bar hinge 130*b*, connecting the second curved section 132 located on the second side 120*b* of the expandable shading unit 120 to the second top rail 126*b*, and connecting the solid panel 134 of the second curved section 132 to the second side support rail 118*b*.

The method 500, further comprising connecting the hydraulic unit 140 to the second frame structure 114 and the first bar hinge 130*a*, wherein the hydraulic unit 140 is configured to move the first curved section 128 from the collapsed position in which the second edge 122*b* of the side expanding portion 122 is adjacent to the first side support rail 118*a* to the deployed position in which the first curved section 128 is raised to the position perpendicular to the first top rail 126*a*.

The method 500, further comprising inserting the top expanding portion 124 into the first D-shaped track 136*a* located within the second edge 128*b* of the first curved section 128 and into the second D-shaped track 136*b* located within the second edge 132*b* of the second curved section 132, wherein the first D-shaped track 136*a* and the second D-shaped track 136*b* are configured to slidingly support the top expanding portion 124 to move from the non-deployed configuration in which the top expanding portion 124 abuts the first top rail 126*a* and the deployed configuration in which two thirds of the top expanding portion 124 extends past the second top rail 126*b*.

The method 500, further comprising connecting the three-fold umbrella mechanism 144 to the plurality of folding panels 142 attached to the first curved section 128, wherein the three-fold umbrella mechanism 144 is configured to move the plurality of folding panels 142 from the collapsed configuration in which the plurality of folding panels 142 are folded adjacent to the first curved section 128 to the deployed configuration in which the plurality of folding panels 142 extend outwardly from the first curved section 128, and connecting at least one support rod 146 between the third frame structure 116 and the expandable shading unit 120 to support the second edge 122*b* of the side expanding portion 122.

The method 500, further comprising connecting the cabinet 172 of the expandable work surface 170 to the straight bottom rail 112*l*, 114*l*, 116*l* of the collapsible frame 110, pulling the drawer 176 located within the cabinet 172 into the deployed configuration in which the drawer 176 extends beyond the back cross section of the pick-up truck bed 10, moving the pair of hinged legs 178 located within the pocket 176*g* on the undersurface 176*f* of the drawer 176 from the undeployed configuration where the pair of hinged legs 178 are flush with the undersurface 176*f* of the drawer 176 to the deployed configuration where the pair of hinged legs 178 extend ninety degrees from the drawer front end 176*a* to support the drawer 176.

The method 500, further comprising raising the front end 180*a* of the top shelf 180 configured to cover at least the portion of the drawer 176 by opening the first spring loaded hinge 182*a* connected to the front end 180*a* of the top shelf 180 and the drawer front end 176*a*, and raising the back end 180*b* of the top shelf 180 by opening the second spring loaded hinge 182*b* connected to the back end 180*b* of the top shelf 180.

Further embodiments include:

An expandable food cart for use in a vehicle trailer. The expandable food cart comprises a collapsible frame configured to conform with a front end cross section and a back end cross section of the vehicle trailer. The expandable food cart further comprises an expandable shading unit having a side expanding portion and a top expanding portion. The expandable food cart further comprises a utility box located in the front end cross section between a first side of the collapsible frame and a second side of the collapsible frame. The expandable food cart further comprises collapsible shelves configured to attach to a sidewall of the vehicle trailer. The expandable food cart further comprises an expandable work surface.

In an aspect, the collapsible frame comprises at least three frame structures, including: a first frame structure configured to attach to the front end cross section of the vehicle trailer; a second frame structure configured to attach to the first frame structure; a third frame structure configured to attach to the back end cross section of the vehicle trailer; a first side support rail configured to connect a first side of the second frame structure to a first side of the third frame structure at a height equal to about a depth of the vehicle trailer; a second side support rail configured to connect a second side of the second frame structure to a second side of the third frame structure at the height equal to about the depth of the vehicle trailer; a first top support rail configured to connect a first top portion of the second frame structure to a corresponding first top portion of the third frame structure, wherein the first top portion and the corresponding first top portion are located near the first sides; and a second top support rail configured to connect a second top portion of the second frame structure to a corresponding second top portion of the third frame structure, wherein the second top portion and the corresponding second top portion are located near the second sides.

In an aspect, each frame structure has: an upper section having an isosceles trapezoidal shape with curved corners, which includes a straight top portion, an angled first side portion and an angled second side portion; and a lower section including a vertical first side portion, a vertical second side portion, and a straight bottom rail connected between a bottom end of the vertical first side portion and a bottom end of the vertical second side portion, wherein the straight top portion of the upper section is configured to connect to and support the expandable shading unit and the straight bottom rail is configured to be mounted in the vehicle trailer.

In an aspect, the expandable shading unit comprises: a first top rail configured to connect to the second frame structure; a second top rail configured to connect to the third frame structure; a first curved section located on a first side of the expandable shading unit between the first top rail and the second top rail, wherein the first curved section is connected to the first top rail by a first bar hinge and to the second top rail by a second bar hinge, wherein a first edge of the side expanding portion is connected to a first edge of the first curved section; a second curved section located on a second side of the expandable shading unit between the first top rail and the second top rail; a solid panel connected to a first edge of the second curved section, wherein the solid panel is connected to the second side support rail; a first D-shaped track located within a second edge of the first curved section, wherein the second edge of the first curved section is located towards a center line of the expandable shading unit which extends from the first top rail to the second top rail; and a second D-shaped track located within a second edge of the second curved section, wherein the second edge of the second curved section is located towards the center line of the expandable shading unit.

In an aspect, the first D-shaped track and the second D-shaped track are configured to slidingly support the top expanding portion to move from a non-deployed configuration in which the top expanding portion abuts the first top rail and a deployed configuration in which about two thirds of the top expanding portion extends past the second top rail.

In an aspect, the side expanding portion comprises: a hydraulic unit connected to the second frame structure and the first bar hinge, wherein the hydraulic unit is configured to move the first curved section from a collapsed position in which a second edge of the side expanding portion is adjacent to the first side support rail to a deployed position in which the first curved section is raised to a position perpendicular to the first top rail.

In an aspect, the side expanding portion further comprises: a plurality of folding panels connected to the first curved section; a three-fold umbrella mechanism connected to the plurality of folding panels, wherein the three-fold umbrella mechanism is configured to move the plurality of folding panels from a collapsed configuration in which the plurality of folding panels are folded adjacent to the first curved section to a deployed configuration in which the plurality of folding panels extend outwardly from the first curved section; and at least one support rod connected between the third frame structure and the expandable shading unit, wherein the support rod is configured to support the second edge of the side expanding portion.

In an aspect, the expandable work surface comprises: a cabinet having a cabinet first end, a cabinet second end, a hollow interior, a first cabinet sidewall and a second cabinet sidewall, wherein the cabinet first end is configured to connect to a straight bottom rail of the collapsible frame; a first drawer slide mounted within the hollow interior of the cabinet along a first sidewall of the hollow interior; a second drawer slide mounted within the hollow interior of the cabinet along a second sidewall of the hollow interior; a drawer having drawer hardware configured to connect to the first drawer slide and the second drawer slide so that the drawer slidably moves within the hollow interior from the cabinet first end to the cabinet second end.

In an aspect, the drawer further comprises: a drawer front end; a pocket located on an undersurface of the drawer; and a pair of hinged legs located within the pocket, wherein the pair of hinged legs are configured to move from an undeployed configuration where the pair of hinged legs are flush with the undersurface of the drawer to a deployed configuration where the pair of hinged legs extend ninety degrees from the drawer front end.

In an aspect, the drawer further comprises: a top shelf configured to cover at least a portion of a top of the drawer; a first spring loaded hinge connected to a front end of the top shelf and the drawer front end; and a second spring loaded hinge connected to a back end of the top shelf, wherein the first spring loaded hinge and the second spring loaded hinge are configured to lift the top shelf above the drawer.

In an aspect, the drawer further comprises a sink located within the drawer; a drain connected to the sink; a water supply fitting connected to the sink; a first aperture located in a bottom side of the cabinet configured to receive a drain hose and a water hose; and a second aperture located in the undersurface of the drawer, wherein the second aperture is configured to receive the drain hose and the water hose, wherein the drain hose is configured to attach to the drain and the water hose is configured to attach to the water supply fitting.

In an aspect, wherein the collapsible shelves comprise ladder-like side rails which hold the collapsible shelves in one of a collapsed configuration in which the collapsible shelves and the ladder-like side rails are in a common plane and in a deployed position in which the collapsible shelves extend at an angle in a range of about 70 degrees to about 90 degrees from the common plane; and a hook on a top end of each of the ladder-like side rails, wherein the hooks are configured to extend over the sidewall of the vehicle trailer.

An embodiment to a method for assembling an expandable food cart in a vehicle trailer. The method comprises assembling a collapsible frame between a front end cross section and a back end cross section of the vehicle trailer. The method further comprises connecting an expandable shading unit having a side expanding portion and a top expanding portion to the collapsible frame. The method further comprises installing a utility box in the front end cross section between a first side of the collapsible frame and a second side of the collapsible frame. The method further comprises attaching, by hooks, a set of collapsible shelves to a sidewall of the vehicle trailer. The method further comprises installing an expandable work surface between the front end cross section and the back end cross section of the a vehicle trailer.

In an aspect, assembling the collapsible frame comprises installing at least three frame structures, including attaching a first frame structure to a front end cross section of the vehicle trailer; attaching a second frame structure to the first frame structure; attaching a third frame structure to the back end cross section of the vehicle trailer; connecting a first side support rail to a first side of the second frame structure and to a first side of the third frame structure at a height equal to about a depth of the vehicle trailer; connecting a second side support rail to a second side of the second frame structure and to a second side of the third frame structure at the height equal to about the depth of the vehicle trailer; connecting a first top support rail to a first top portion of the second frame structure and to a corresponding first top portion of the third frame structure, wherein the first top portion and the corresponding first top portion are located near the first sides; and connecting a second top support rail to a second top portion of the second frame structure and to a corresponding second top portion of the third frame structure, wherein the second top portion and the corresponding second top portion are located near the second sides.

In an aspect, connecting the expandable shading unit to the collapsible frame comprises: connecting a first top rail of the expandable shading unit to the second frame structure; connecting a second top rail of the expandable shading unit to the third frame structure; connecting a first curved section, located on a first side of the expandable shading unit between the first top rail and the second top rail, to the first top rail by a first bar hinge and to the second top rail by a second bar hinge; connecting a second curved section located on a second side of the expandable shading unit to the second top rail; and connecting a solid panel of the second curved section to the second side support rail.

In an aspect, the method comprises connecting a hydraulic unit to the second frame structure and the first bar hinge, wherein the hydraulic unit is configured to move the first curved section from a collapsed position in which a second edge of the side expanding portion is adjacent to the first side support rail to a deployed position in which the first curved section is raised to a position perpendicular to the first top rail.

In an aspect, the method comprises inserting the top expanding portion into a first D-shaped track located within a second edge of the first curved section and into a second D-shaped track located within a second edge of the second curved section, wherein the first D-shaped track and the second D-shaped track are configured to slidingly support the top expanding portion to move from a non-deployed configuration in which the top expanding portion abuts the first top rail and a deployed configuration in which two thirds of the top expanding portion extends past the second top rail.

In an aspect, the method comprises connecting a three-fold umbrella mechanism to a plurality of folding panels attached to the first curved section, wherein the three-fold umbrella mechanism is configured to move the plurality of folding panels from a collapsed configuration in which the plurality of folding panels are folded adjacent to the first curved section to a deployed configuration in which the plurality of folding panels extend outwardly from the first curved section; and connecting at least one support rod between the third frame structure and the expandable shading unit to support the second edge of the side expanding portion.

In an aspect, the method comprises connecting a cabinet of the expandable work surface to a straight bottom rail of the collapsible frame; pulling a drawer located within the cabinet into a deployed configuration in which the drawer extends beyond the back cross section of the pick-up truck bed; moving a pair of hinged legs located within a pocket on the undersurface of the drawer from an undeployed configuration where the pair of hinged legs are flush with the undersurface of the drawer to a deployed configuration where the pair of hinged legs extend ninety degrees from the drawer front end to support the drawer.

In an aspect, the method comprises raising a front end of a top shelf configured to cover at least a portion of the drawer by opening a first spring loaded hinge connected to the front end of the top shelf and the drawer front end; and raising a back end of the top shelf by opening a second spring loaded hinge connected to the back end of the top shelf.

Figure 6:
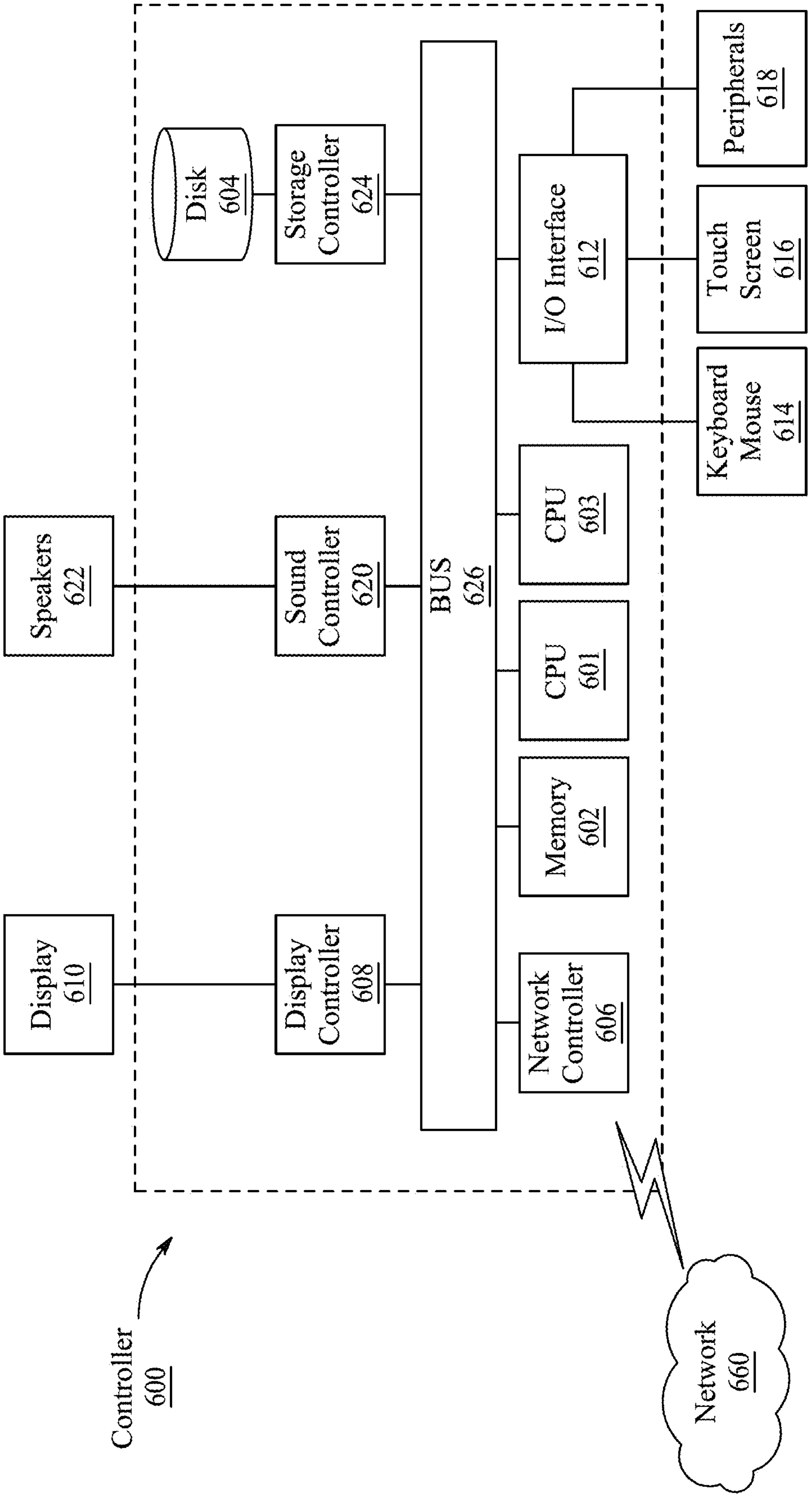
FIG. 6 is an illustration of a non-limiting example of details of computing hardware used in the computing system, according to certain embodiments.

Next, further details of the hardware description of a computing environment according to exemplary embodiments is described with reference to FIG. 6. In FIG. 6, a controller 600 is described, in which the controller 600 is representative of the microprocessor described with respect to the tracking system. The controller 600 includes a CPU 601 which performs the processes described above/below. The process data and instructions may be stored in memory 602. These processes and instructions may also be stored on a storage medium disk 604 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 601, 603 and an operating system such as Microsoft Windows 7, Microsoft Windows 8, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 601 or CPU 603 may be a Xenon or Core processor from Intel of America or an Opteron processor from AMD of America, or may be other processor types that would be recognized by one of ordinary skill in the art. Alternatively, the CPU 601, 603 may be implemented on an FPGA, ASIC, PLD or using discrete logic circuits, as one of ordinary skill in the art would recognize. Further, CPU 601, 603 may be implemented as multiple processors cooperatively working in parallel to perform the instructions of the inventive processes described above.

The computing device in FIG. 6 also includes a network controller 606, such as an Intel Ethernet PRO network interface card from Intel Corporation of America, for interfacing with network 660. As can be appreciated, the network 660 can be a public network, such as the Internet, or a private network such as an LAN or WAN network, or any combination thereof and can also include PSTN or ISDN sub-networks. The network 660 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as a touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computing device such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computing device. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 7.

Figure 7:
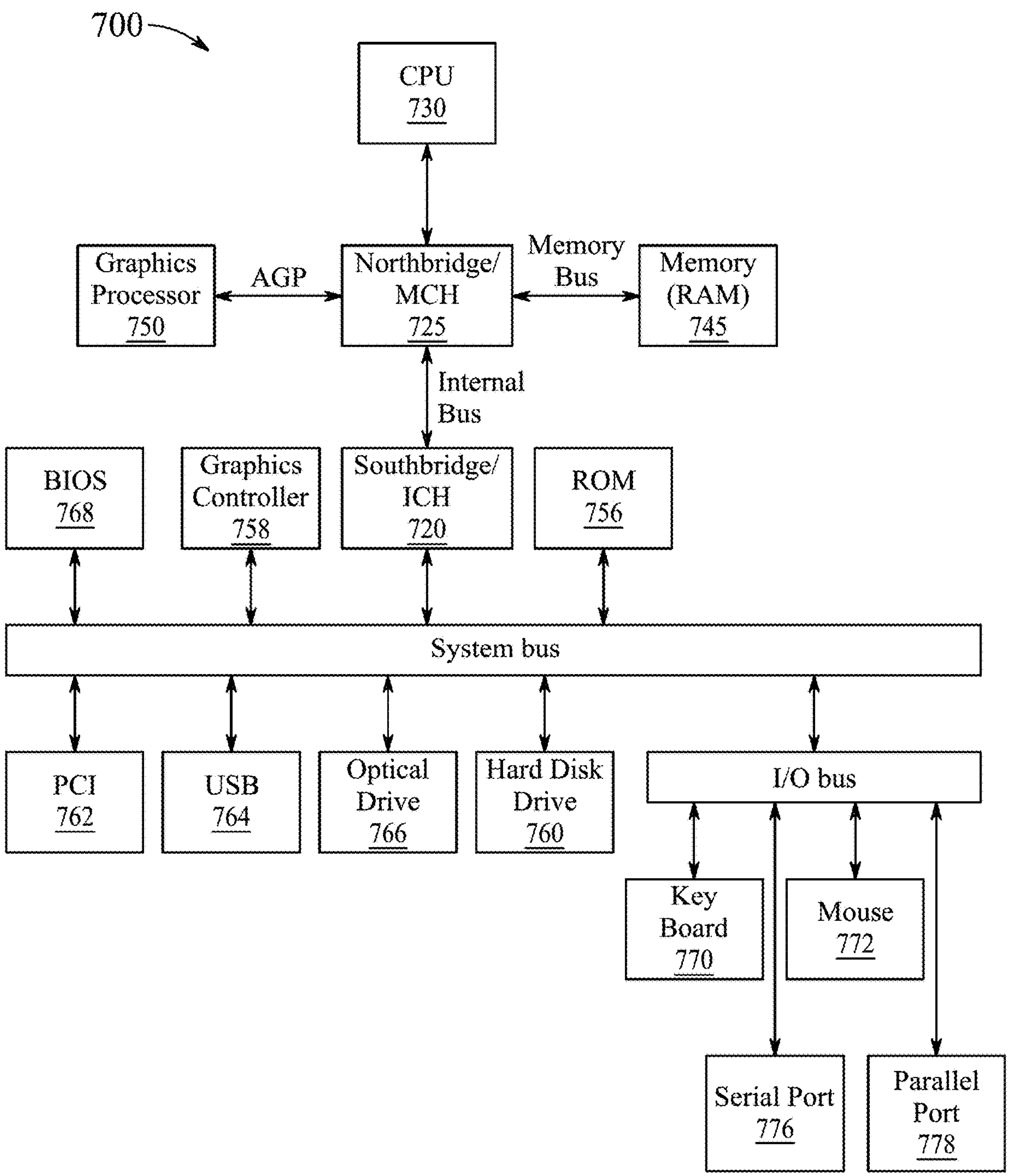
FIG. 7 is an exemplary schematic diagram of a data processing system used within the computing system, according to certain embodiments.

FIG. 7 shows a schematic diagram of a data processing system, according to certain embodiments, for performing the functions of the exemplary embodiments. The data processing system is an example of a computer in which code or instructions implementing the processes of the illustrative embodiments may be located.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU Processing unit 730 may contain one or more processors and even may be implemented using one or more heterogeneous processor systems.

Figure 8:
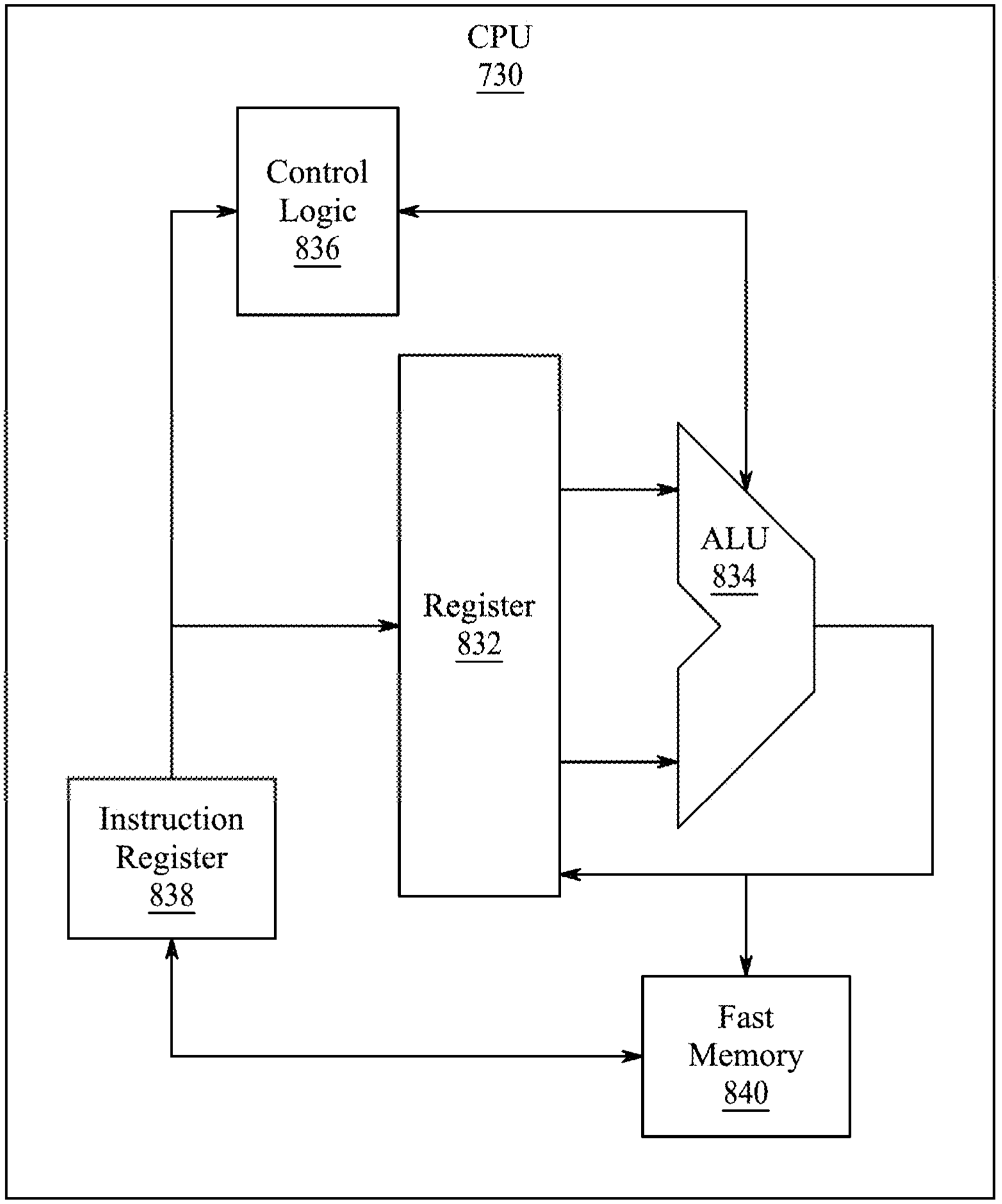
FIG. 8 is an exemplary schematic diagram of a processor used with the computing system, according to certain embodiments.

For example, FIG. 8 shows one implementation of CPU 730. In one implementation, the instruction register 838 retrieves instructions from the fast memory 840. At least part of these instructions are fetched from the instruction register 838 by the control logic 836 and interpreted according to the instruction set architecture of the CPU 730. Part of the instructions can also be directed to the register 832. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 7, the data processing system 700 can include that the SB/ICH 720 is coupled through a system bus to an I/O Bus, a read only memory (ROM) 756, universal serial bus (USB) port 764, a flash binary input/output system (BIOS) 768, and a graphics controller 758. PCI/PCIe devices can also be coupled to SB/ICH 788 through a PCI bus 762.

The PCI devices may include, for example, Ethernet adapters, add-in cards, and PC cards for notebook computers. The Hard disk drive 760 and CD-ROM 766 can use, for example, an integrated drive electronics (IDE) or serial advanced technology attachment (SATA) interface. In one implementation the I/O bus can include a super I/O (SIO) device.

Further, the hard disk drive (HDD) 760 and optical drive 766 can also be coupled to the SB/ICH 720 through a system bus. In one implementation, a keyboard 770, a mouse 772, a parallel port 778, and a serial port 776 can be connected to the system bus through the I/O bus. Other peripherals and devices that can be connected to the SB/ICH 720 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 9:
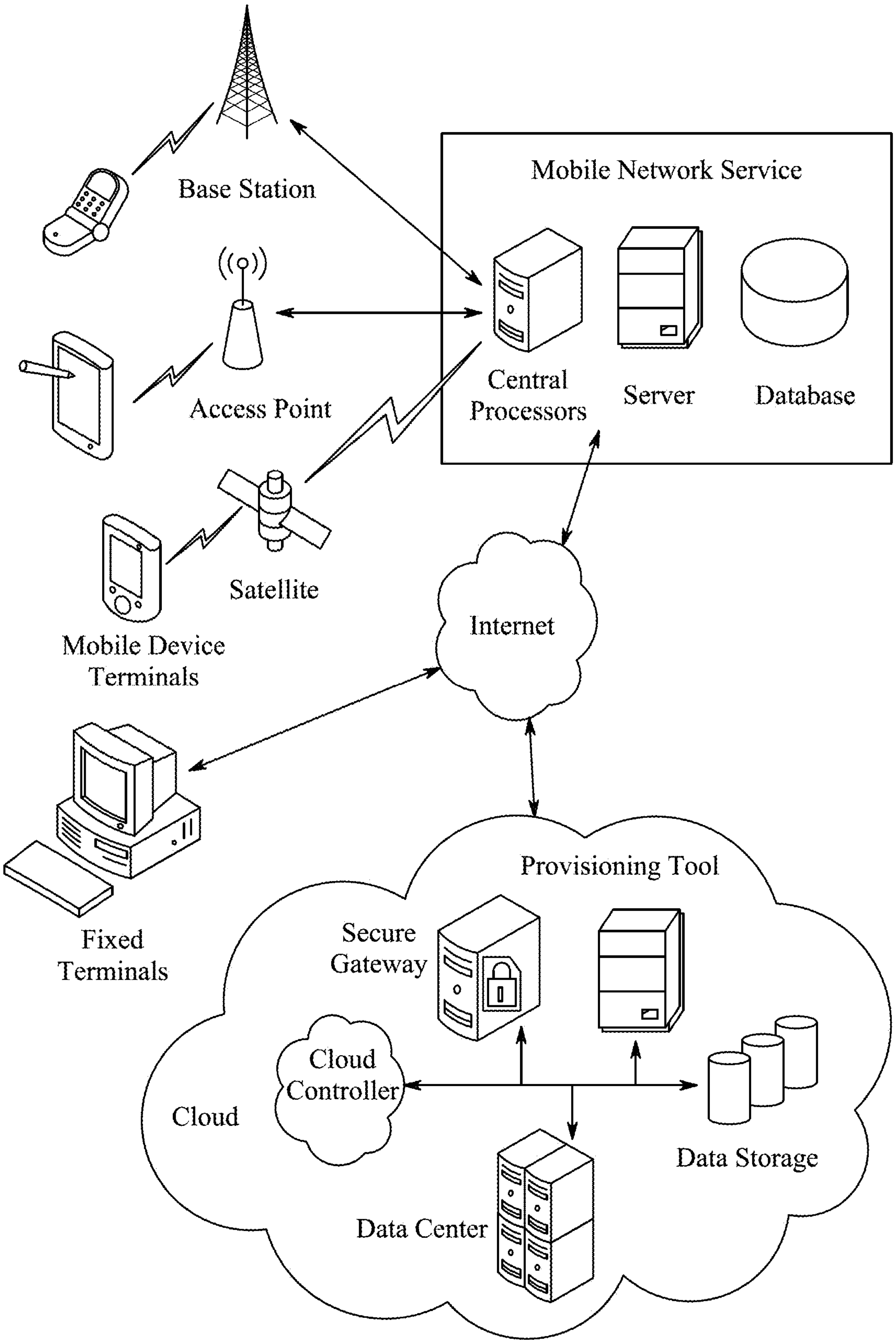
FIG. 9 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 9, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An expandable food cart for use in a pick-up truck bed, comprising:
- a collapsible frame configured to conform with a front end cross section and a back end cross section of the pick-up truck bed;
- an expandable shading unit having a side expanding portion and a top expanding portion;
- a utility box located in the front end cross section between a first side of the collapsible frame and a second side of the collapsible frame;
- collapsible shelves configured to attach to a sidewall of the pick-up truck bed; and
- an expandable work surface.

2. The expandable food cart of claim 1, wherein the collapsible frame comprises at least three frame structures, including:
- a first frame structure configured to attach to the front end cross section of the pick-up truck bed;
- a second frame structure configured to attach to the first frame structure;
- a third frame structure configured to attach to the back end cross section of the pick-up truck bed;
- a first side support rail configured to connect a first side of the second frame structure to a first side of the third frame structure at a height equal to a depth of the pick-up truck bed;

a second side support rail configured to connect a second side of the second frame structure to a second side of the third frame structure at the height equal to the depth of the pick-up truck bed;

a first top support rail configured to connect a first top portion of the second frame structure to a corresponding first top portion of the third frame structure, wherein the first top portion and the corresponding first top portion are located near the first sides; and a second top support rail configured to connect a second top portion of the second frame structure to a corresponding second top portion of the third frame structure, wherein the second top portion and the corresponding second top portion are located near the second sides.

3. The expandable food cart of claim 2, wherein each frame structure has:

an upper section having an isosceles trapezoidal shape with curved corners, which includes a straight top portion, an angled first side portion and an angled second side portion; and a lower section including a vertical first side portion, a vertical second side portion, and a straight bottom rail connected between a bottom end of the vertical first side portion and a bottom end of the vertical second side portion, wherein the straight top portion of the upper section is configured to connect to and support the expandable shading unit and the straight bottom rail is configured to be mounted in the pick-up truck bed.

4. The expandable food cart of claim 2, wherein the expandable shading unit comprises:

a first top rail configured to connect to the second frame structure;

a second top rail configured to connect to the third frame structure;

a first curved section located on a first side of the expandable shading unit between the first top rail and the second top rail, wherein the first curved section is connected to the first top rail by a first bar hinge and to the second top rail by a second bar hinge, wherein a first edge of the side expanding portion is connected to a first edge of the first curved section;

a second curved section located on a second side of the expandable shading unit between the first top rail and the second top rail;

a solid panel connected to a first edge of the second curved section, wherein the solid panel is connected to the second side support rail;

a first D-shaped track located within a second edge of the first curved section, wherein the second edge of the first curved section is located towards a center line of the expandable shading unit which extends from the first top rail to the second top rail; and a second D-shaped track located within a second edge of the second curved section, wherein the second edge of the second curved section is located towards the center line of the expandable shading unit.

5. The expandable food cart of claim 4, wherein the first D-shaped track and the second D-shaped track are configured to slidingly support the top expanding portion to move from a non-deployed configuration in which the top expanding portion abuts the first top rail and a deployed configuration in which two thirds of the top expanding portion extends past the second top rail.

6. The expandable food cart of claim 4, wherein the side expanding portion comprises:

a hydraulic unit connected to the second frame structure and the first bar hinge, wherein the hydraulic unit is configured to move the first curved section from a collapsed position in which a second edge of the side expanding portion is adjacent to the first side support rail to a deployed position in which the first curved section is raised to a position perpendicular to the first top rail.

7. The expandable food cart of claim 4, wherein the side expanding portion further comprises:

a plurality of folding panels connected to the first curved section;

a three-fold umbrella mechanism connected to the plurality of folding panels, wherein the three-fold umbrella mechanism is configured to move the plurality of folding panels from a collapsed configuration in which the plurality of folding panels are folded adjacent to the first curved section to a deployed configuration in which the plurality of folding panels extend outwardly from the first curved section; and at least one support rod connected between the third frame structure and the expandable shading unit, wherein the support rod is configured to support the second edge of the side expanding portion.

8. The expandable food cart of claim 1, wherein the expandable work surface comprises:

a cabinet having a cabinet first end, a cabinet second end, a hollow interior, a first cabinet sidewall and a second cabinet sidewall, wherein the cabinet first end is configured to connect to a straight bottom rail of the collapsible frame;

a first drawer slide mounted within the hollow interior of the cabinet along a first sidewall of the hollow interior;

a second drawer slide mounted within the hollow interior of the cabinet along a second sidewall of the hollow interior;

a drawer having drawer hardware configured to connect to the first drawer slide and the second drawer slide so that the drawer slidably moves within the hollow interior from the cabinet first end to the cabinet second end.

9. The expandable food cart of claim 8, wherein the drawer further comprises:

a drawer front end;

a pocket located on an undersurface of the drawer; and a pair of hinged legs located within the pocket, wherein the pair of hinged legs are configured to move from an undeployed configuration where the pair of hinged legs are flush with the undersurface of the drawer to a deployed configuration where the pair of hinged legs extend ninety degrees from the drawer front end.

10. The expandable food cart of claim 9, wherein the drawer further comprises:

a top shelf configured to cover at least a portion of a top of the drawer;

a first spring loaded hinge connected to a front end of the top shelf and the drawer front end; and a second spring loaded hinge connected to a back end of the top shelf, wherein the first spring loaded hinge and the second spring loaded hinge are configured to lift the top shelf above the drawer.

11. The expandable food cart of claim 10, further comprising:

a sink located within the drawer;

a drain connected to the sink;

a water supply fitting connected to the sink;

a first aperture located in a bottom side of the cabinet configured to receive a drain hose and a water hose; and a second aperture located in the undersurface of the drawer, wherein the second aperture is configured to receive the drain hose and the water hose, wherein the drain hose is configured to attach to the drain and the water hose is configured to attach to the water supply fitting.

12. The expandable food cart of claim 1, wherein the collapsible shelves comprise:

side rails which hold the collapsible shelves in one of a collapsed configuration in which the collapsible shelves and the side rails are in a common plane and in a deployed position in which the collapsible shelves extend at an angle in a range of 70 degrees to 90 degrees from the common plane; and a hook on a top end of each of the side rails, wherein the hooks are configured to extend over the sidewall of the pick-up truck bed.

13. A method for assembling an expandable food cart in a pick-up truck bed, comprising:

assembling a collapsible frame between a front end cross section and a back end cross section of the pick-up truck bed;

connecting an expandable shading unit having a side expanding portion and a top expanding portion to the collapsible frame;

installing a utility box in the front end cross section between a first side of the collapsible frame and a second side of the collapsible frame;

attaching, by hooks, a set of collapsible shelves to a sidewall of the pick-up truck bed; and installing an expandable work surface between the front end cross section and the back end cross section of the pick-up truck bed.

14. The method of claim 13, wherein assembling the collapsible frame comprises installing at least three frame structures, including:

attaching a first frame structure to a front end cross section of the pick-up truck bed;

attaching a second frame structure to the first frame structure;

attaching a third frame structure to the back end cross section of the pick-up truck bed;

connecting a first side support rail to a first side of the second frame structure and to a first side of the third frame structure at a height equal to about a depth of the pick-up truck bed;

connecting a second side support rail to a second side of the second frame structure and to a second side of the third frame structure at the height equal to about the depth of the pick-up truck bed;

connecting a first top support rail to a first top portion of the second frame structure and to a corresponding first top portion of the third frame structure, wherein the first top portion and the corresponding first top portion are located near the first sides; and connecting a second top support rail to a second top portion of the second frame structure and to a corresponding second top portion of the third frame structure, wherein the second top portion and the corresponding second top portion are located near the second sides.

15. The method of claim 14, wherein connecting the expandable shading unit to the collapsible frame comprises:

connecting a first top rail of the expandable shading unit to the second frame structure;

connecting a second top rail of the expandable shading unit to the third frame structure;

connecting a first curved section, located on a first side of the expandable shading unit between the first top rail and the second top rail, to the first top rail by a first bar hinge and to the second top rail by a second bar hinge;

connecting a second curved section located on a second side of the expandable shading unit to the second top rail; and connecting a solid panel of the second curved section to the second side support rail.

16. The method of claim 15, further comprising:

connecting a hydraulic unit to the second frame structure and the first bar hinge, wherein the hydraulic unit is configured to move the first curved section from a collapsed position in which a second edge of the side expanding portion is adjacent to the first side support rail to a deployed position in which the first curved section is raised to a position perpendicular to the first top rail.

17. The method of claim 15, further comprising:

inserting the top expanding portion into a first D-shaped track located within a second edge of the first curved section and into a second D-shaped track located within a second edge of the second curved section, wherein the first D-shaped track and the second D-shaped track are configured to slidingly support the top expanding portion to move from a non-deployed configuration in which the top expanding portion abuts the first top rail and a deployed configuration in which two thirds of the top expanding portion extends past the second top rail.

18. The method of claim 15, further comprising:

connecting a three-fold umbrella mechanism to a plurality of folding panels attached to the first curved section, wherein the three-fold umbrella mechanism is configured to move the plurality of folding panels from a collapsed configuration in which the plurality of folding panels are folded adjacent to the first curved section to a deployed configuration in which the plurality of folding panels extend outwardly from the first curved section; and connecting at least one support rod between the third frame structure and the expandable shading unit to support the second edge of the side expanding portion.

19. The method of claim 13, further comprising:

connecting a cabinet of the expandable work surface to a straight bottom rail of the collapsible frame;

pulling a drawer located within the cabinet into a deployed configuration in which the drawer extends beyond the back cross section of the pick-up truck bed;

moving a pair of hinged legs located within a pocket on the undersurface of the drawer from an undeployed configuration where the pair of hinged legs are flush with the undersurface of the drawer to a deployed configuration where the pair of hinged legs extend ninety degrees from the drawer front end to support the drawer.

20. The method of claim 19, further comprising:

raising a front end of a top shelf configured to cover at least a portion of the drawer by opening a first spring loaded hinge connected to the front end of the top shelf and the drawer front end; and raising a back end of the top shelf by opening a second spring loaded hinge connected to the back end of the top shelf.

* * * * *